United States Patent

Moura et al.

[11] Patent Number: 5,859,852
[45] Date of Patent: Jan. 12, 1999

[54] HYBRID ACCESS SYSTEM WITH AUTOMATED CLIENT-SIDE CONFIGURATION

[75] Inventors: Eduardo J. Moura, San Joe; Jan Maksvmilian Gronski, Palo Alto, both of Calif.

[73] Assignee: Hybrid Networks, Inc., San Jose, Calif.

[21] Appl. No.: 703,892

[22] Filed: Aug. 27, 1996

Related U.S. Application Data

[62] Division of Ser. No. 426,920, Apr. 21, 1995, Pat. No. 5,586,121.

[51] Int. Cl.⁶ .................................................. H04J 3/16
[52] U.S. Cl. ..................... 370/449; 370/346; 370/402; 340/825.08
[58] Field of Search ..................................... 370/401, 402, 370/449, 245, 404, 431, 498, 312, 346, 395; 340/825.52, 825.54, 825.07, 825.08

[56] References Cited

U.S. PATENT DOCUMENTS

| | | | |
|---|---|---|---|
| 4,638,313 | 1/1987 | Sherwood, Jr. et al. | 340/825.52 |
| 4,680,583 | 7/1987 | Grover | 340/825.52 |
| 4,894,789 | 1/1990 | Yee | 364/521 |
| 4,987,486 | 1/1991 | Johnson et al. | 358/86 |
| 5,014,125 | 5/1991 | Pocock et al. | 358/86 |
| 5,051,822 | 9/1991 | Rhoades | 358/86 |
| 5,093,718 | 3/1992 | Hoarty et al. | 358/84 |
| 5,195,092 | 3/1993 | Wilson et al. | 370/498 |
| 5,373,288 | 12/1994 | Blahut | 370/85.8 |
| 5,517,488 | 5/1996 | Miyazaki et al. | 370/245 |
| 5,539,736 | 7/1996 | Johnson et al. | 370/85.13 |
| 5,572,517 | 11/1996 | Safadi | 370/431 |
| 5,572,528 | 11/1996 | Shuen | 370/85.13 |
| 5,586,121 | 12/1996 | Moura et al. | 370/404 |

OTHER PUBLICATIONS

Request For Comments (RFC) 951, Croft, Bill and Gilmore, John, dated Oct. 1985 (downloaded from on from InterNIC archives at http://www.internic.net/ds/dspg2interdoc.html, on Nov. 17, 1997).
Request For Comments (RFC) 1531, Droms, Ralph, dated Oct. 1993 (downloaded from on from InterNIC archives at http://www.internic.net/ds/dspg2intdoc html, on Nov. 13, 1997).

*Primary Examiner*—Douglas W. Olms
*Assistant Examiner*—Shick Hom
*Attorney, Agent, or Firm*—Kile McIntyre & Harbin

[57] ABSTRACT

An asymmetric network communication system for use in a client-server environment having independent forward and return channels operating at different speeds and/or under different protocols on the same or different communication media to provide efficient utilization of shared resources. A network manager, such as a hybrid access system, effects transmission of packetized data on a forward (downstream) channel from the host server to multiple client devices coupled with a shared downstream media at 10 or more megabits per second while simultaneously providing selectable multiple lower speeds of operation on shared or dedicated return (upstream) channels from the client devices to the host server depending on bandwidth availability, bandwidth demand, service level authorization, etc, for the return channel. Forward and return channels may be located on the same or different communication medium including a CATV network, direct broadcast satellite network, television or radio RF broadcast network, wireless or mobile cellular facilities or the like. The return channel may reside on a PSTN either directly coupled with the host server or connected with the network manager for subsequent transmission to the host server. The network manager handles or controls the forward and return communication to establish interactive full-duplex real-time network sessions between the host and a selected client device. The network manager switches upstream channel assignment based on quality of signals transmitted to the host, effects changes in the upstream transmitted power based on sensed conditions, and automatically configures new client devices as they are added to the network.

36 Claims, 20 Drawing Sheets

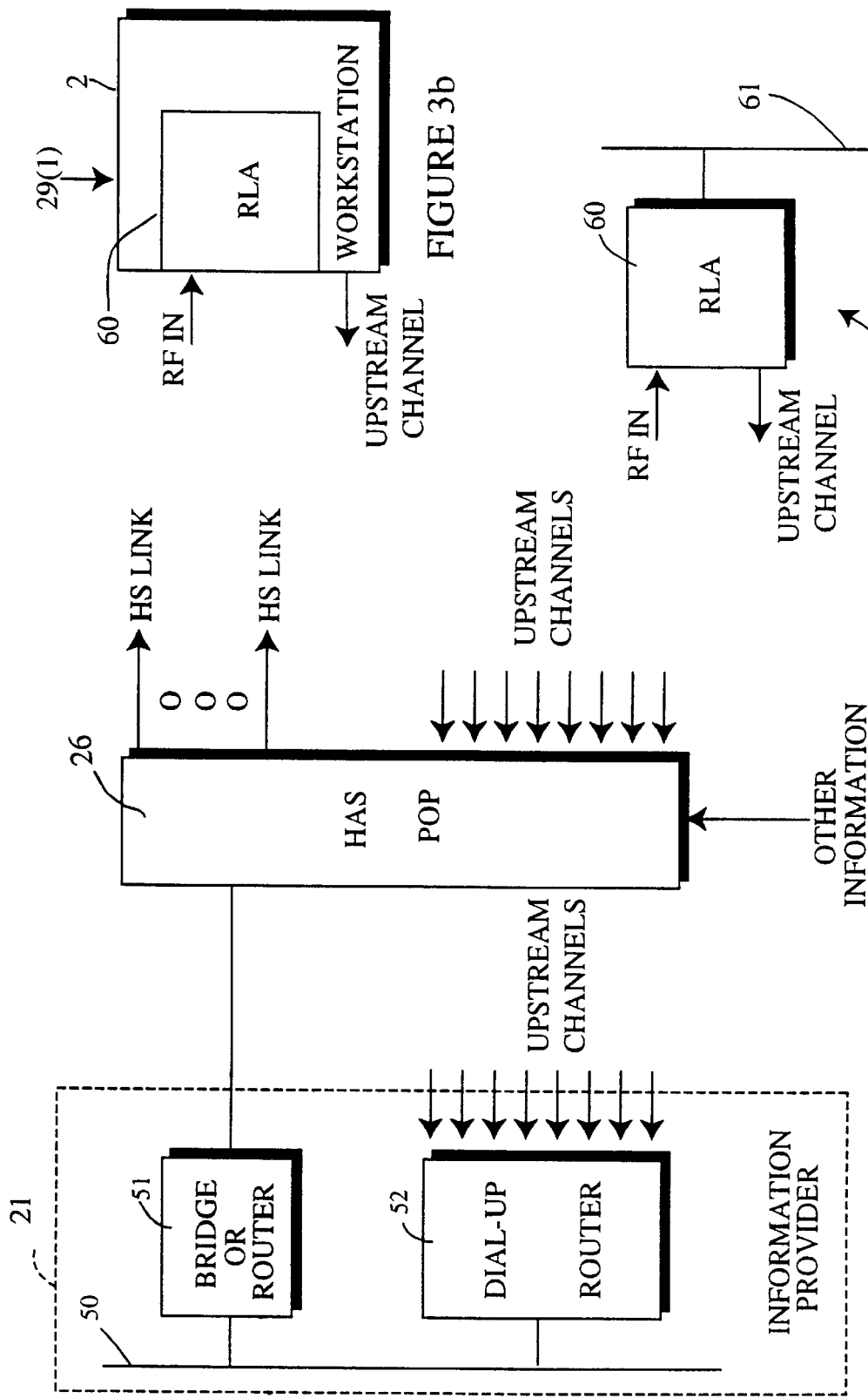

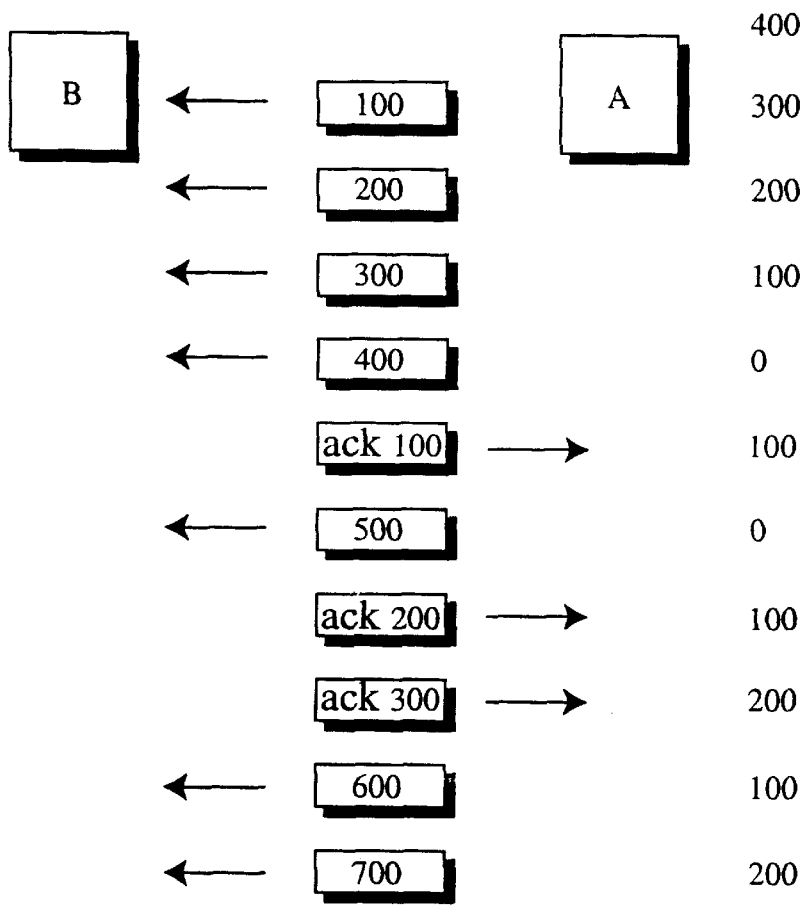
FIGURE 14a
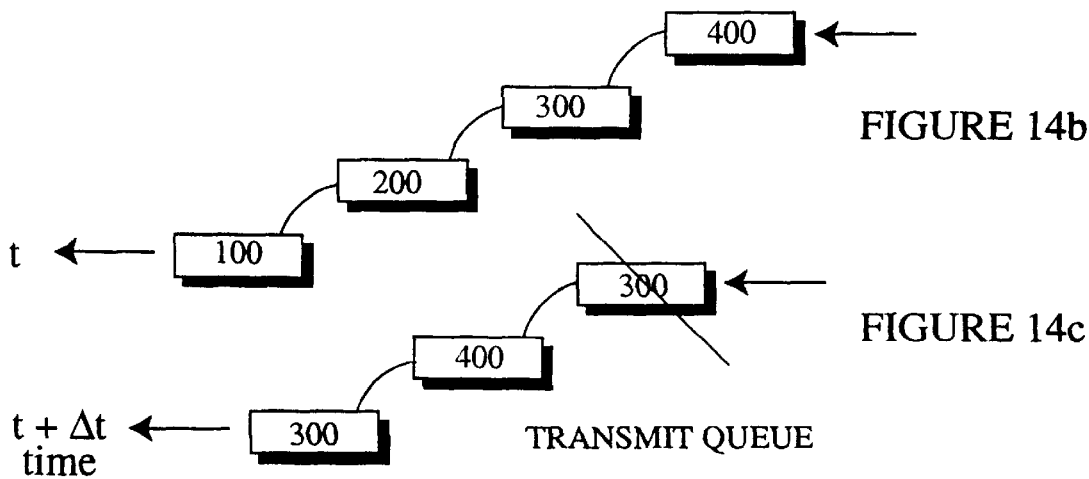
FIGURE 14b
FIGURE 14c
TRANSMIT QUEUE

HYBRID ACCESS SYSTEM WITH AUTOMATED CLIENT-SIDE CONFIGURATION

This is a division of application Ser. No. 08/426,920, filed Apr. 21, 1995 now U.S. Pat. No. 5,586,121.

FIELD OF INVENTION

This invention relates to systems and methods for extending a high-speed network to remote locations using an asymmetric hybrid access system.

BACKGROUND OF THE INVENTION

Current data communication systems typically use symmetric communication paths between transmit and receive sites, which have substantially the same data rates and use the same media in both directions. Such media may include coaxial, fiber optic, or telephone twisted-pair lines. Some networks alternatively use broadcast only paths. However, no current network combines the flexibility of full-duplex symmetric networks with the cost effectiveness of broadcast only networks.

Prior attempts at achieving asymmetric data communications included modems with very low speed return channels or systems combining a low speed broadcast channel with telephone return lines. However, no prior systems were able to extend a symmetric high-speed backbone network to remote locations at high speeds using an asymmetric hybrid access system. Known prior asymmetric systems are limited to low speed links.

It is desirable to develop a network which combines the flexibility of a full-duplex network with the effectiveness of a broadcast network at a reasonable cost.

SUMMARY OF THE INVENTION

According to the present invention, a high speed backbone network is extended for communications with remote locations with a hybrid asymmetric architecture having fully interactive duplex characteristics and including independent upstream and downstream communication paths operable at separately selectable speeds and protocols. According to one embodiment of the present invention, the hybrid asymmetric architecture includes 6 Megahertz television channels downstream and telephone lines for upstream communications. Alternative downstream communications can be accomplished according to the invention with a selected high bandwidth broadband service, including for example high definition television (HDTV). Downstream communications according to another embodiment can be implemented with a selected low cost, high speed broadband modem. Downstream communications can provide access to data from information sources including companies, government agencies, universities, libraries, and the like. Alternative upstream communications can be accomplished by a narrow band cable TV return channel, ISDN, radio, or a selected low-cost, low to medium speed telephone modem. The asymmetric hybrid system according to the present invention includes an interface with the backbone network connected to selected information sources. The interface includes point of presence (POP) circuits implementing high speed downstream communications with lower speed upstream communications. The interface connects the backbone network with cable TV head ends, TV transmitters, cell sites, remote users, and upstream and downstream channels.

The present invention further includes a hybrid access configuration which uses both downstream and upstream channels. The present invention further includes a hybrid access configuration which uses downstream wireless TV channels and upstream public switch telephone network (PSTN), wireless RF communications or integrated services digital network (ISDN) telephone lines. The present invention further includes a hybrid access configuration which uses both downstream and upstream cable TV channels. The present invention further includes a hybrid access configuration which has downstream satellite TV channels and upstream public switch telephone network (PSTN), wireless RF communications, or integrated services digital network (ISDN) telephone lines.

The present invention further includes packet and acknowledge suppression methods to eliminate redundant packet, byte, and acknowledge transmissions in a hybrid access system. A packet is defined as an information unit containing one or more bytes of information. Particularly according to the method of the present invention, a certain amount or number of data packets or bytes are enqueued or transmitted in a transmit-ahead window. Transmission of a window of bytes or packets is followed by a predetermined time-out period while the transmit queue awaits acknowledgments of packets received. To the extent receipt acknowledgments are received as to particular bytes or packets, these packets and bytes in the transmit queue will be deleted from the transmit queue, and the transmit queue is open to receipt of further packets or bytes for emplacement in slots of the transmission queue for the deletions made. With respect to acknowledgments placed in a transmission queue, indications acknowledging receipt of later bytes and packets supersede acknowledgments of earlier transmitted bytes or packets. Accordingly, under the present invention, the earlier acknowledgments are deleted from an acknowledge transmission queue.

The present invention further includes an automatic address allocation and configuration method in transmissions employing a hybrid access system. According to the present invention, remote users are identified initially with an abstract name, e.g., "Bob," and this abstract name is registered by the network management system. Configuration is established by the downstream routers polling the remote users and registering the location of the remote user responding to the poll made with the particular abstract name. Internet Protocol address and upstream channel allocation is accordingly accomplished subject to the configuration made including abstract name and identified location.

The present invention further includes a prioritized polling method in transmissions employing a hybrid access system. According to a method of the present invention, hybrid upstream routers poll client devices such as remote link adapters (i.e., "RLAs") according to predetermined priority levels. According to one embodiment of the present invention, priority levels are established for state categories of RLAs. According to one embodiment of the present invention, priority level states include status states such as idle, non-responsive, requesting channel(s), active, or active-credit. According to one embodiment of the present invention. RLAs which request a channel are prioritized according to the amount of time its channel requests have gone unfulfilled. According to one embodiment of the present invention hybrid upstream routers poll downstream RLAs which are idle more frequently than non-responsive RLAs.

The present invention further includes an automatic gain adjustment technique in transmissions employing a hybrid access system, according to which a remote link adapter sends successive indications to a hybrid upstream router at selected different power levels. When a power level indication is received by a hybrid upstream router, the receiving hybrid upstream router confirms receipt of such indication to the sending remote link adapter which then registers an associated power level as qualified. According to one embodiment of the present invention the selected different power levels are dynamically adjusted in magnitude of transmission level.

The present invention further includes a quality-based upstream channel allocation technique in transmissions employing a hybrid access system. According to the technique, the hybrid upstream router first determines the availability of upstream cable channels by a frequency agile RLA setting a wide range of narrowband upstream channels. The upstream router then makes a quality assessment of available channels in view of most recent demand, and it finally selects an upstream channel in view of the quality assessment made. Quality assessment includes determination of busy status and signal characteristics including error rates, noise floor, and signal to noise ratio. Upstream channels are releasable according to inactivity or time-out criteria, according to which release or reassignment occurs responsive to inactivity for over a threshold period. Inactivity is assessed by the hybrid upstream router monitoring operability indications and data packets received from assigned RLAs.

The present invention further includes a credit allocation technique in transmissions employing a hybrid access system. According to a method of the present invention, an upstream channel is shared by a plurality of RLAs in accordance with a credit criterion, and credit control packets are dispatched to a RLA which permit the RLA to send data packets to arbitrary hosts. Upon sending a data packet, the RLA returns the credit control packet to a server containing software including Hybridware™ code which manages data flows. The Hybridware™ code or Hybridware™ server, according to one embodiment of the present invention, includes software distributed among data processors in the upstream and downstream routers and elsewhere in the HASPOP, including for example in the network management system.

DESCRIPTION OF THE DRAWINGS

FIGS. 3a, 3b, and 3c comprise a pictorial diagram of a hybrid access system according to the present invention according to which a remote user can communicate with an information provider through the hybrid access system:

FIG. 14a is a diagram of a sequential data transmission between first and second network nodes, according to the present invention:

FIG. 14b is a diagram of the contents of a conventional transmission queue in the downstream node during a first time period:

FIG. 14c shows the contents of a transmission queue in a downstream node during a later time period, eliminating retransmission of the 300 packet according to the present invention, because another 300 packet was already in the transmission queue:

DESCRIPTION OF THE PREFERRED EMBODIMENT

Figure 1:
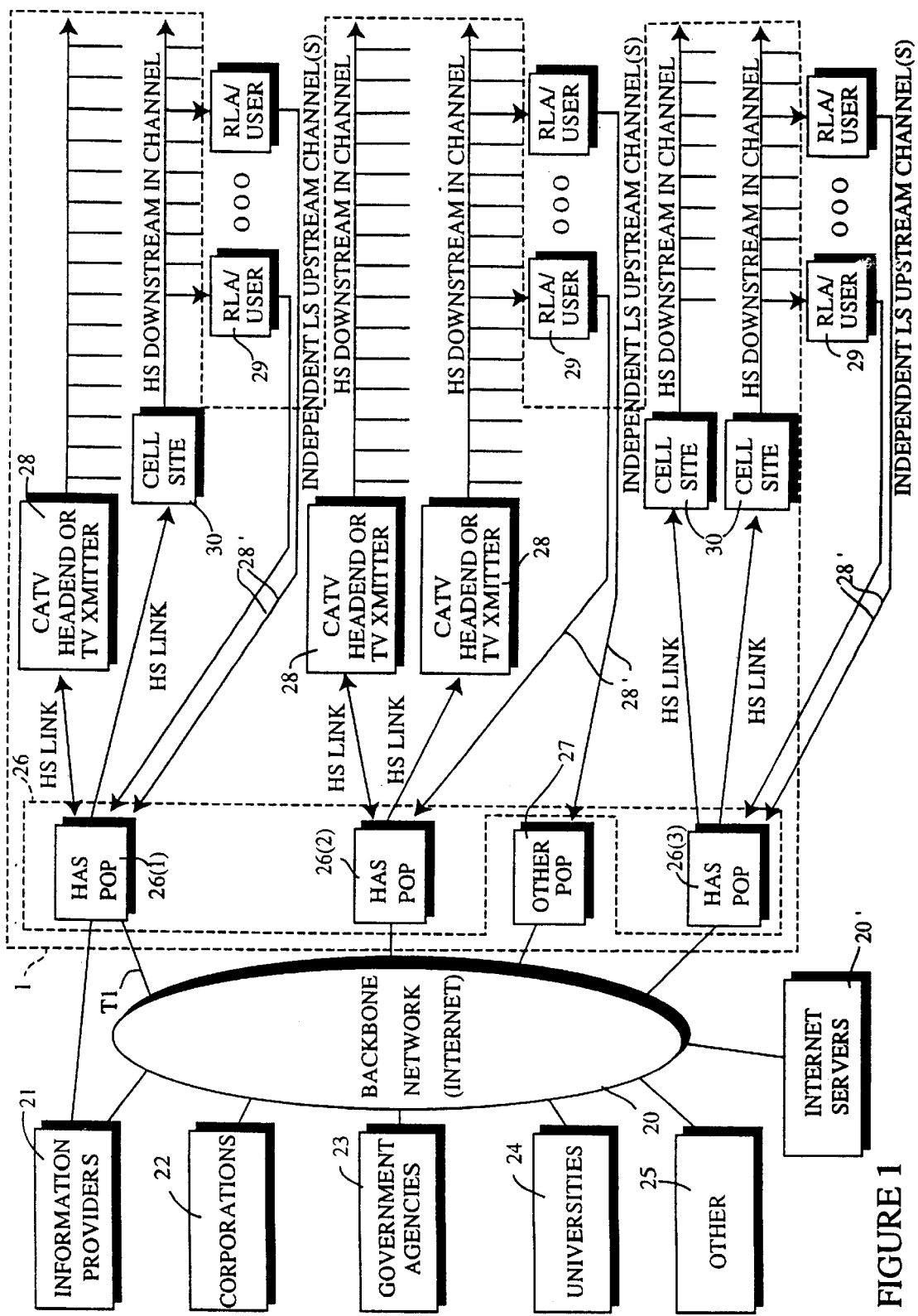
FIG. 1 is a detailed schematic drawinig of a hybrid access system connected to a backbone network such as the Internet, and having points of presence connecting the backbone network to cable TV headends, TV transmitters, or Logical Nodes (e.g., cell sites), with remote users connecting to an RLA which in turn connects to downstream TV channels and independent lower speed upstream channels.

FIG. 1 is a detailed schematic drawing of a hybrid access system 1 according to the present invention, showing a RLA and user workstation 29 connected through hybrid access system 1 to a variety of entities connected to a backbone network 20 such as Internet, including information providers 21, corporations 22, government agencies 23, universities 24, and others 25. A backbone network is one which is typically not directly connected to a user. Hybrid access system 1 according to an embodiment of the present invention includes hybrid access system (HAS) points of presence (POPs) 26 and other points of presence 27. HASPOPs 26 include individual HASPOPs 26(1)–26(3) which enable communication over a broadband network, either by upstream and downstream cable communications or by downstream cable and upstream telephone communications or various other hybrid configurations (e.g., wireless or satellite). The present invention particularly includes (1) a hybrid access configuration which uses downstream cable TV channels and upstream public switch telephone network (PSTN), wireless RF communications or integrated services digital network (ISDN) telephone lines: (2) a hybrid access configuration which uses downstream wireless TV channels and upstream public switch telephone network (PSTN), wireless RF communications or integrated services digital network (ISDN) telephone lines: (3) a hybrid access configuration which uses both downstream and upstream cable TV channels: (4) a hybrid access configuration which uses both downstream and upstream wireless channels: and (5) a hybrid access configuration with downstream satellite channels and upstream PSTN, wireless RF communications or ISDN telephone channels.

Backbone network 20 such as the Internet which includes a plurality of Internet servers 20' connected to HASPOPs 26 each including a plurality of host computers and/or servers, collectively referred to as hybrid servers. Hybrid access system 1 further includes broadcast units such as, a cable television (TV) head end 28, independent upstream channels 28: and a RLA 29. U.S. Pat. No. 5,347,304 (1994) assigned to Hybrid Networks, Inc., and describing an example of an RLA is hereby expressly referenced and incorporated herein in its entirety. An RLA may receive analog broadcast signals including encoded digital information which the RLA decodes and provides to a data terminal or computer. According to an embodiment of the present invention, the downstream flow of information proceeds from HASPOPs 26(1)–26(3) through cable TV head end or TV transmitters 28 or cell sites 30 and through RLA and user workstation 29.

Upstream information flow proceeds in one case from RLA and user workstation 29 through independent upstream channels 28: to HASPOP 26(1), and then to backbone network 20: alone T1 or T3 or other digital lines. In another case, upstream information proceeds from user workstation through RLA 29 through the cable TV network, and cable TV head end 28 to hybrid access system point of presence and then through T1, T3, or other digital lines to backbone network 20. The outputs of the cable TV headends or TV transmitters 28 include pluralities of high speed downstream broadband radio frequency, i.e., RF, channels connected to respective remote users 29. Hybrid access system 1 further includes a plurality of cell sites 30 connected through high speed links to a corresponding hybrid access system point of presence 5. The outputs of cell sites 30 include pluralities of high speed downstream broadband channels connected to selected remote users 29. A particular remote user 29 can be connected via an independent lower speed upstream channel to a hybrid access system point of presence 26 as discussed below or via a similar independent lower speed upstream channel to another point of presence system 27. By lower speed it is meant at a speed reduced from the speed of the high speed link used to transmit information downstream. A particular hybrid access system point of presence 5 can be connected via duplex high speed links to a plurality of cable TV headends or TV transmitters, to a plurality of cell sites 30, or a combination of cable TV headends or TV transmitters 28 and cell sites 30.

Figure 2A:
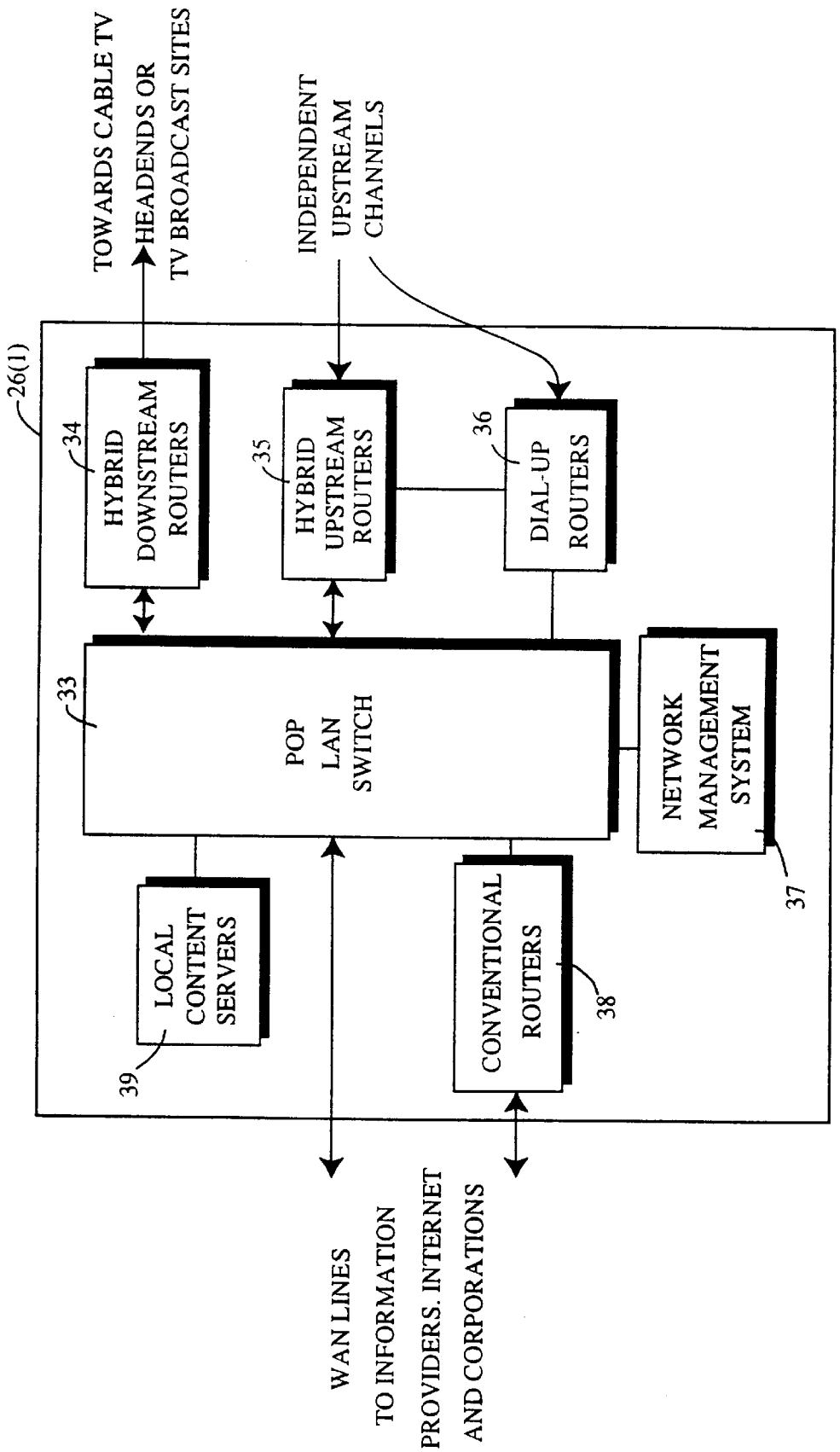
FIG. 2a is a schematic drawing of a hybrid access system point of presence (POP) according to the present invention including at least a single host computer or server and at least a single router including a hybrid downstream router, a hybrid upstream router, a dial-up router, an Internet router, or a backbone network router, and a POP LAN switch.

FIG. 2a is a schematic drawing of a point of presence (POP) system 26(1) according to the present invention, including host computers or servers 39 and a POP local area network, i.e., LAN switch 33 to which host computers or servers 39 are connected. Further connected to LAN switch 33 are one or more downstream and one or more upstream hybrid access system point of presence routers, respectively 34 and 35, one or more dial-up routers 36, a network management system 37, and conventional routers 38. Connected to POP LAN switch 33 are one or more data storage elements or systems. Each downstream hybrid access system point of presence router 34 is connected with a high speed link to a TV transmitter or cable TV headend, for example. Further, each upstream hybrid access system point of presence router 35 is connected to a plurality of independent upstream channels, which operate at a lower speed than the downstream high speed links to TV transmitters or cable TV headends. Each dial-up router 36 is connected to a plurality of independent upstream channels operating at a lower speed than the indicated downstream high speed links. Each conventional router 38 is connected along a high speed line to wide area network (WAN) lines to selected information providers, Internet, or other nodes or businesses. POP LAN switch 33, according to one embodiment of the present invention is connected directly along a high speed line to wide area network (WAN) lines to selected information providers, Internet, or other nodes or businesses.

Figure 2B:
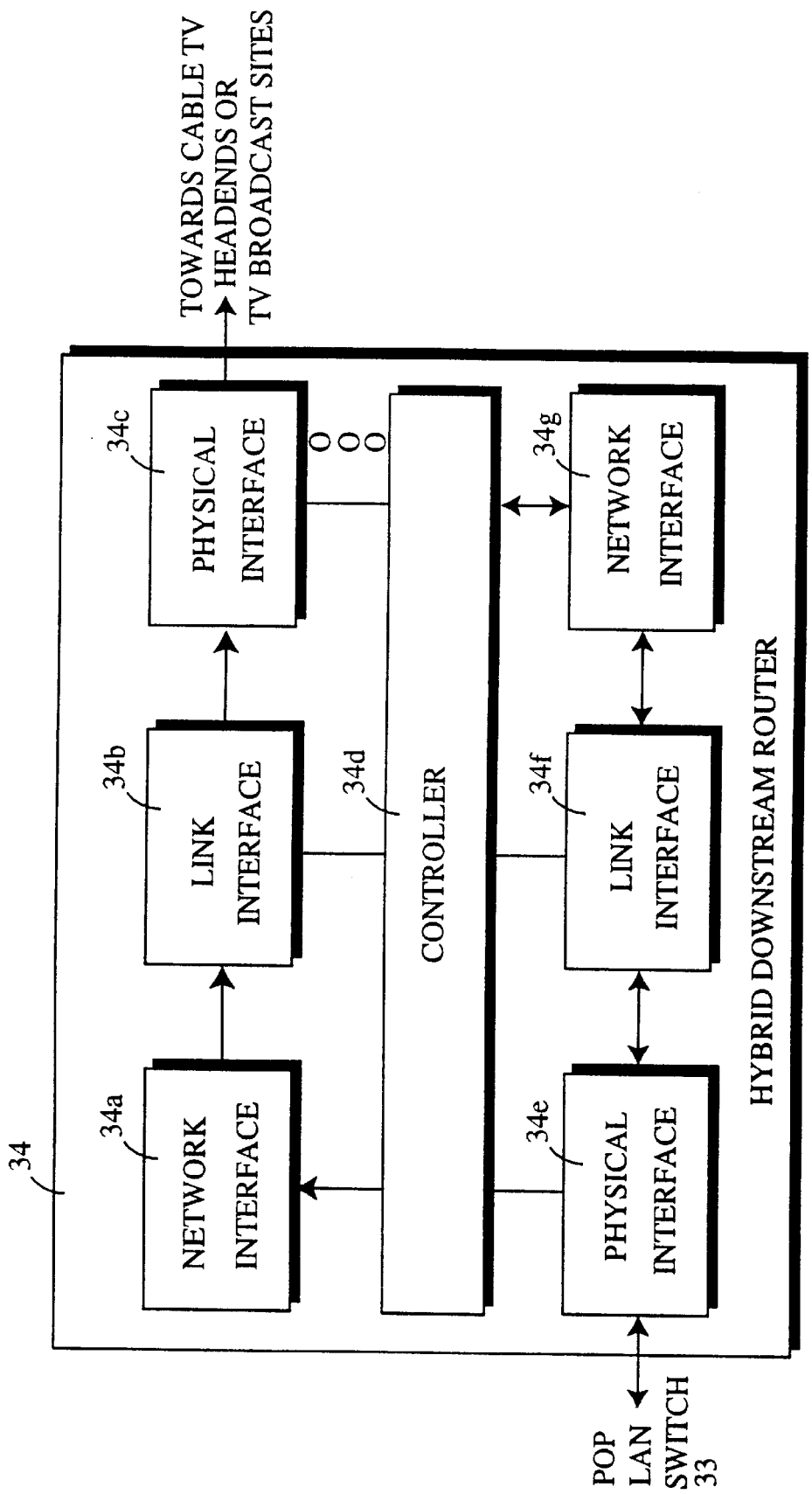
FIG. 2b is a block diagram of a downstream router according to the present invention.

FIG. 2b is a block diagram of hybrid downstream router 34 according to the present invention. In particular, downstream router 34 includes network interface 34a, link interface 34b, physical interface 34c, controller 34d, physical interface 34e, link interface 34f, and network interface 34g, Downstream router 34 and physical interface 34e are connected to POP LAN switch 33 for sending and receiving information, and physical interface 34e, link interface 34f, and network interface 34g, are serially connected to each other and to controller 34d for bidirectional communication of selected information, Additionally, controller 34d is connected directly to each of physical interface 34e and link interface 34f along indicated lines to accomplish control and messaging functions. Downstream router 34 and physical interface 34c are connected to cable TV headends. TV broadcast sites, cell cites or the like, to communicate information primarily or exclusively in a unidirectional or downstream direction, and physical interface 34c, link interface 34b, and network interface 34a are serially connected to each other and to controller 34d for selected communication of selected information. Additionally, controller 34d is connected directly to each of physical interface 34c and link interface 34b alone indicated lines to accomplish control and messaging functions. Downstream router 34 may include one or more of physical interfaces 34c. According to an embodiment of the present invention, router 34 may be a bridge without network interfaces 34a and 34g or a connection without network interfaces 34a and 34g and without link interfaces 34b and 34f. According to yet another embodiment of the present invention, router 34 can be a gateway.

Figure 2C:
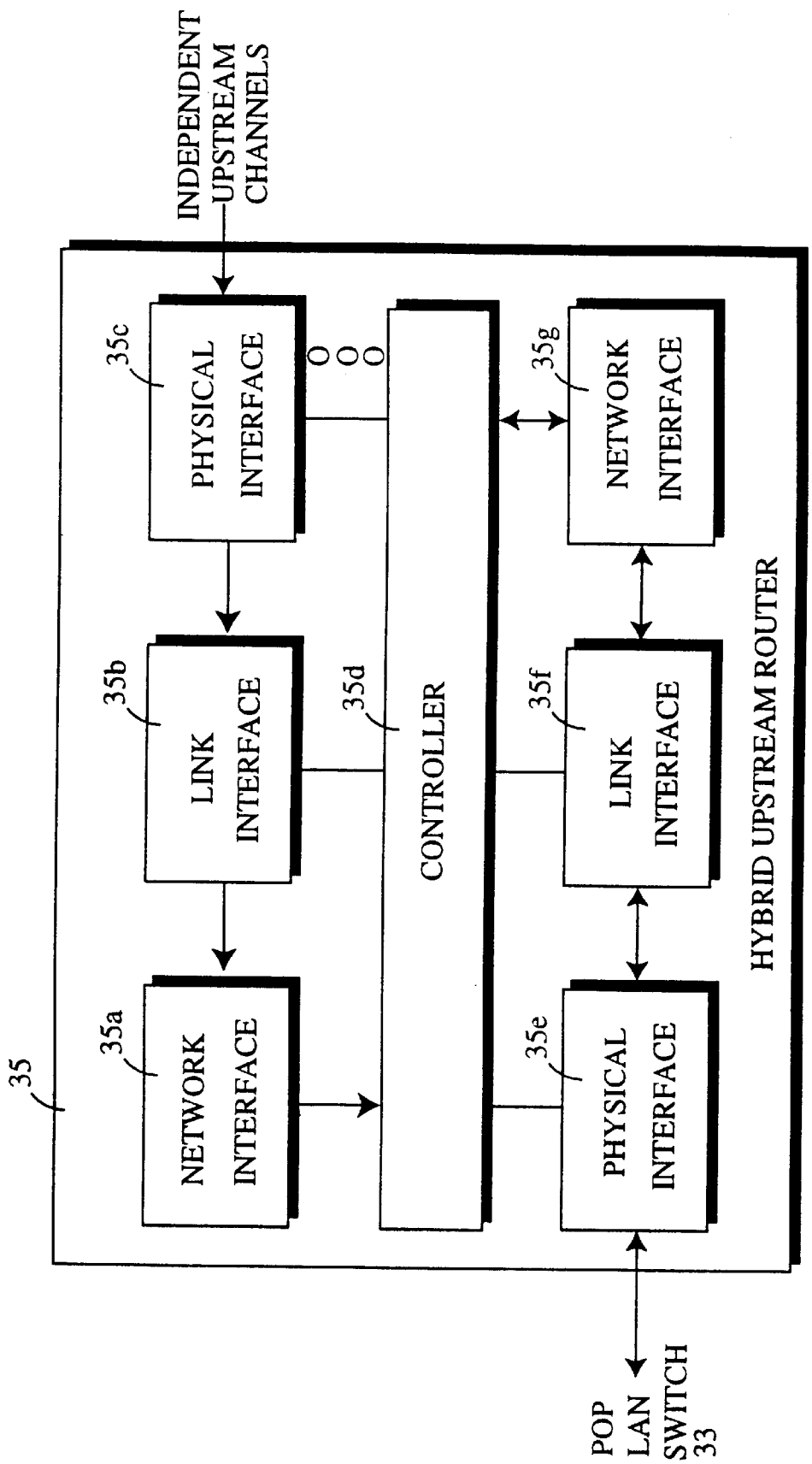
FIG. 2c is a block diagram of an upstream router according to the present invention.

FIG. 2c is a block diagram of upstream router 35 according to the present invention. In particular, upstream router 35 includes network interface 35a, link interface 35b, physical interface 35c, controller 35d, physical interface 35e, link interface 35f, and network interface 35g. Upstream router 35 and physical interface 35e are connected to POP LAN switch 33 for sending and receiving information, and physical interface 35e, link interface 35f, and network interface 35g are serially connected to each other and to controller 35d for bidirectional communication of selected information. Additionally, controller 35d is connected directly to each of physical interface 35e and link interface 35f along indicated lines to accomplish control and messaging functions. Upstream router 35 and physical interface 35c are connected to upstream channels, e.g., telephone links for example, to communicate information primarily or exclusively in a unidirectional or upstream direction, and physical interface 35c, link interface 35b, and network interface 35a are serially connected to each other and to controller 35d for selected communication of selected information. Additionally, controller 35d is connected directly to each of physical interface 35c and link interface 35b along indicated lines to accomplish control and messaging functions. Upstream router 35 may include one or more of physical interfaces 35c. According to an embodiment of the present invention, router 35 may be a bridge without network interfaces 35a and 35g or a connection without network interfaces 35a and 35g and without link interfaces 35b and 35f. According to yet another embodiment of the present invention, router 35 can be a gateway.

FIGS. 3a–3b are drawings of a hybrid access system 1 according to the present invention according to which remote user having a workstation 2 or connected to LAN 61, as shown respectively in FIGS. 3b and 3c can communicate with a selected information provider 21 including LAN 50, bridge or router 51 connected to LAN 50, and dial-up router 52 connected to LAN 50 through a hybrid access system point of presence 26. Further, HAS POP is connected along a high speed link to bridge or router 51. Additionally, HAS POP 26 is linked to other information providers to receive selected information items. Additionally, dial-up router 52 is connected to a plurality of upstream channels. FIGS. 3b and 3c additionally show respective first and second users, in one case including workstation 2 in turn including a RLA 60 and in the other instance including RLA 60 and a local area network (LAN) 61 connected to RLA 60. First user 29(1) is connected to an upstream channel from user workstation 2, and second user 29(2) is connected to an upstream channel directly from RLA 60. In the case of each user, RLA 60 receives input information, particularly radio frequency (RE) information along one of respective input channels connected thereto.

Figure 4:
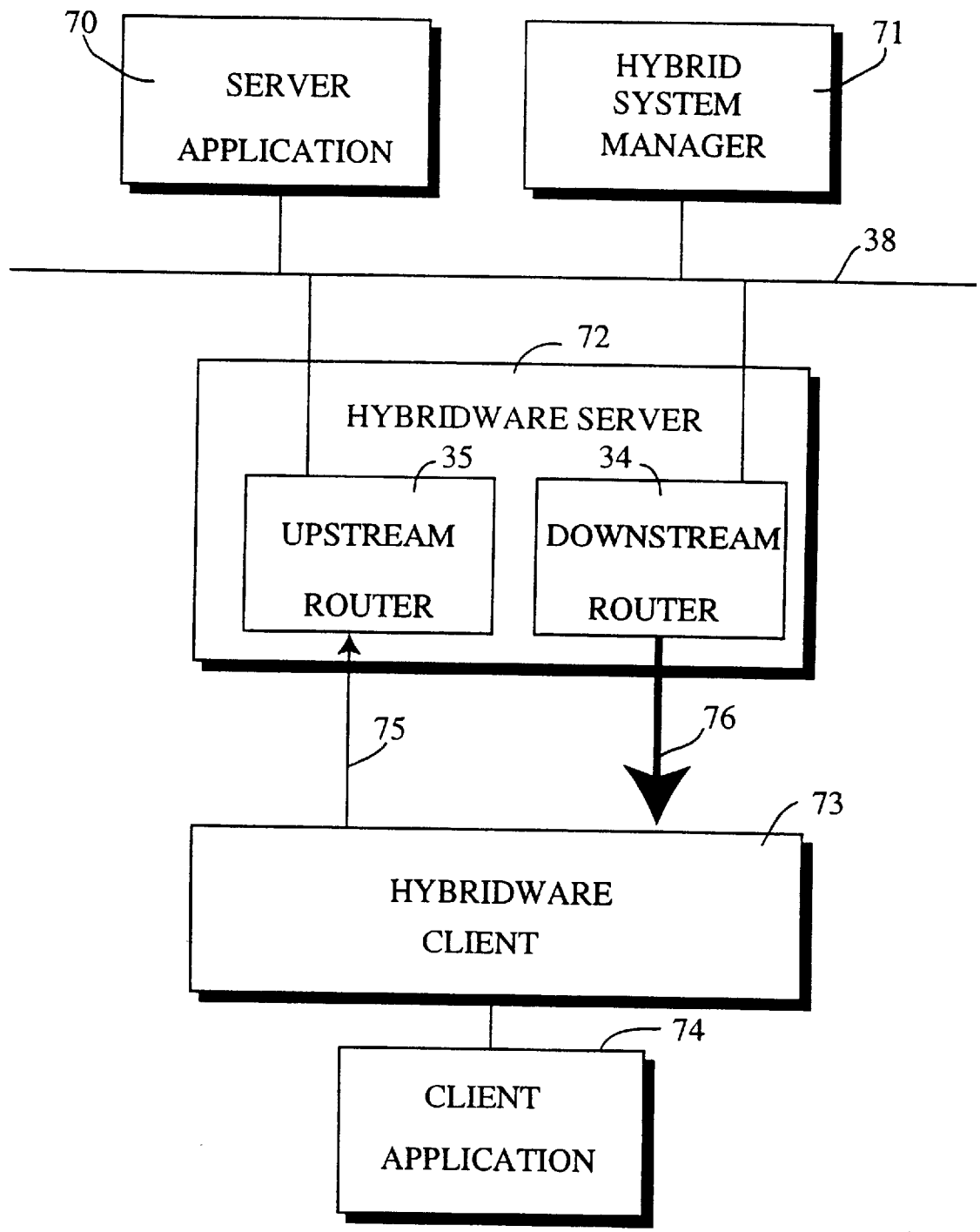
FIG. 4 is a logical data flow diagram showing data flows between a server and a client computer of the hybrid access system according to the present invention.

FIG. 4 is a logical data flow diagram showing data flows between a server and a client computer of the hybrid access system 1 according to the present invention. Hybrid access system 1 includes a server application 70, a hybrid system manager 71, and a Hybridware™ server 72 connected to LAN 38. Hybrid access system 1 further includes a Hybridware™ client 73 and a client application 74 operating with Hybridware™ client 73. Hybridware™ client 73 communicates with Hybridware™ server 72, as transmitter along upstream channel 75 or as receiver along downstream channel 76. Downstream data traffic is expected to be higher capacity than upstream data traffic: Hence, the bolder depiction of downstream channel 76 than upstream channel 75.

Figure 5:
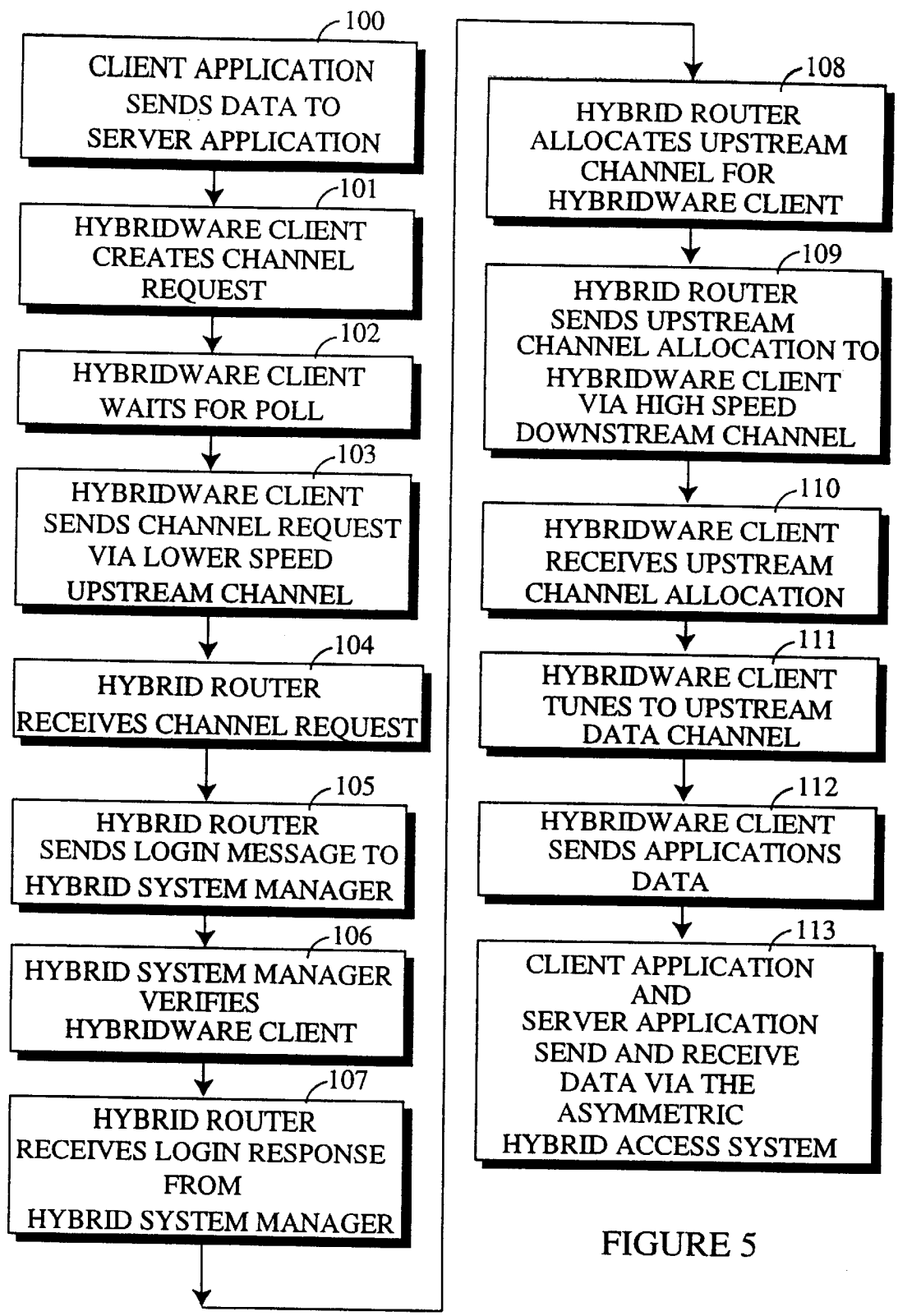
FIG. 5 is a flow chart of operation of a two-way cable network embodiment of the hybrid access system according to the present invention.

FIG. 5 is a flow chart of operation of a two-way cable network embodiment of hybrid access system 1 according to a hybrid protocol embodiment of the present invention. In particular, according to one embodiment of the hybrid protocol of the present invention, client application 74 sends 100 data to server application 70 in an upstream direction, thereby issuing a connection request. Hybridware™ client 73 buffers the data received and checks if it controls an upstream data channel. If it does, then the data is transmitted forthwith. If it doesn't, Hybridware™ client 73 queues up the data message and creates 101 a channel request for a particular subchannel within upstream channel 75. Hybridware™ client 73 then waits 102 for a poll from Hybridware™ server 72, i.e., Hybridware™ router. According to an embodiment of the present invention, prioritized polling is conducted whereby not all clients are polled at the same frequency. Clients in an idle state are polled relatively frequently. Clients in blocked and NON-RESP states are polled but not at the same relatively high frequency. Clients in an ACTIVE state are not polled at all. This is based on the assumption that an active client has what it wants and that it is most important to respond quickly to new connections coming from clients in an IDLE state. Those clients coming from a NON_RESP cycle receive second order attention and can wait a little longer, since they may have already been in a state where communication are impossible and may have been in that state for a considerable period of time. According to one embodiment of the present invention, a poll cycle is the smallest period such that all but active clients are polled at least once. Idle clients may be polled multiple times during one poll cycle. Blocked and non_resp clients are distributed evenly across the poll cycle to assure that the latency for acquiring a channel for idle units is uniform. All clients are grouped according to their state and polled within each group according to the round robin approach according which each of a series is polled in sequence and then the same sequence is repeatedly polled individual by individual. Upon receipt of a poll, Hybridware™ client 73 sends 103 a channel request via lower speed upstream channel 75. Hybridware™ router 72, i.e., server receives 104 the channel request from Hybridware™ client 73 and initially sends 105 a login message to Hybridware™ system manager 71. Hybridware™ system manager 71 verifies 106 that Hybridware™ client 73 is an authorized user of data processing services on the particular node or system within which hybrid access system 1 operates. Then, Hybridware™ router 72 receives 107 a login response message from Hybridware™ system manager 71 through LAN 38, which indicates whether the client is allowed to operate on the particular network and which contains other operating characteristics of Hybridware™ client 73. Hybridware™ router 72 then allocates 108 (see state diagrams of FIGS. 7 and 8) an upstream channel 75 for Hybridware™ client 73, depending on channel availability and suitability. Suitability depends on factors including but not limited to channel quality, type of service required, operating characteristics of Hybridware™ client 73, configuration restrictions, and the like. Hybridware™ router 72 sends 109 an upstream channel allocation message to Hybridware™ client 73 via high speed downstream channel 76, which may according to one embodiment of the present invention specify the frequency on which Hybridware™ client 73 is permitted to transmit. Thereafter, Hybridware™ client 73 receives 110 an upstream channel allocation. Next, Hybridware™ client 73 tunes 111 to the specifically allocated upstream data channel frequency on which it is permitted to transmit data. Finally, Hybridware™ client 73 sends 112 the selected application data from client application 74. Accordingly, client application 74 and server application 70 are able to send and receive 113 data via upstream bandwidth management of an asymmetric hybrid access system, according to the present invention.

Figure 6:
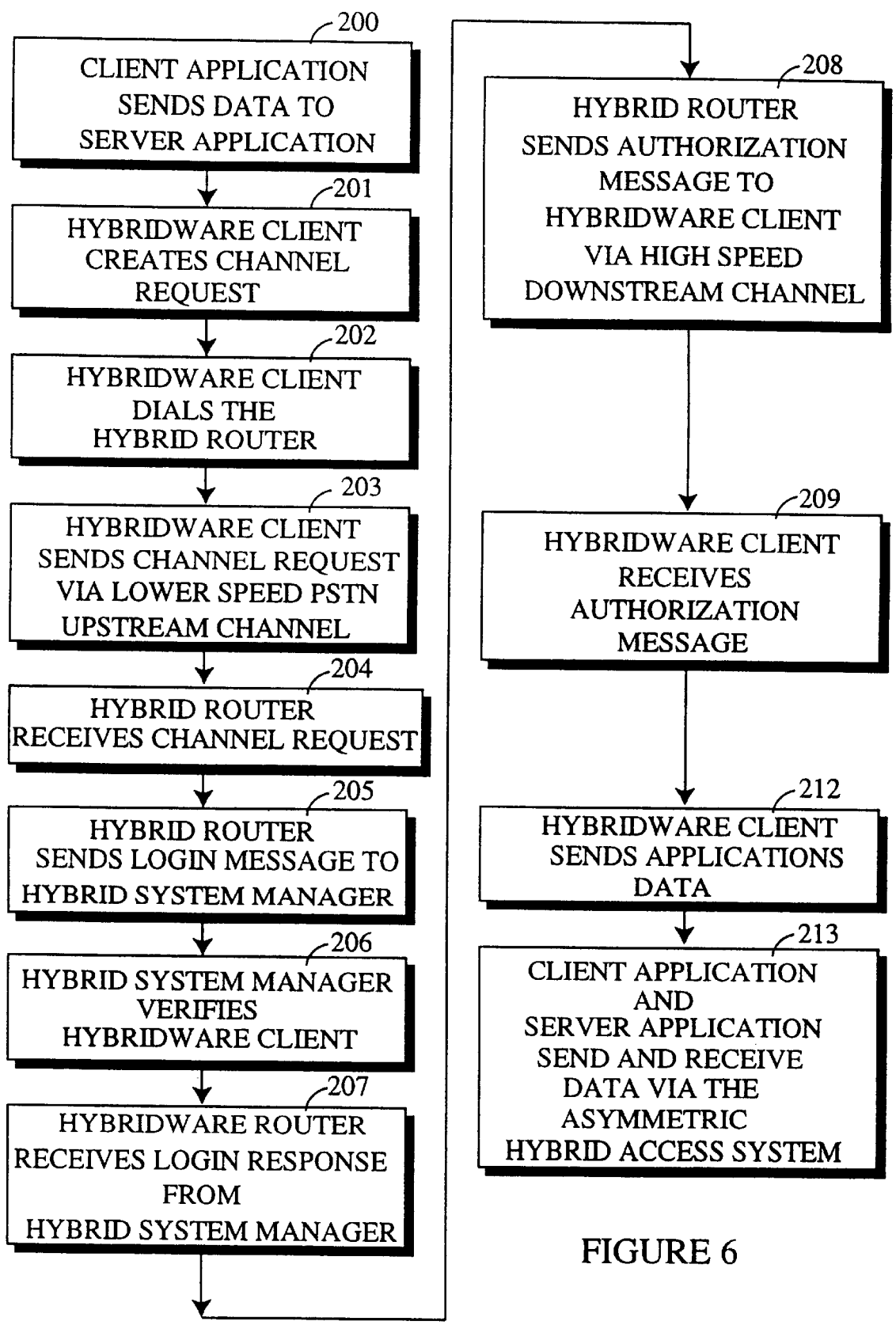
FIG. 6 is a flow chart of operation of a one-way cable network embodiment of the hybrid access system according to the present invention, including provision for upstream telephone system data flow.

FIG. 6 is a flow chart of operation of a one-way cable network embodiment of the hybrid access system 1 according to the present invention, including provision for upstream telephone system data flow. According to this embodiment of the present invention, when client application 74 needs to conmmunicate with server application 70 in an upstream direction, Hybridware™ client 73 dials 202 Hybridware™ router 77. Then, Hybridware™ client 73 sends 203 a channel request via lower speed PSTN upstream channel (not shown). Hybridware™ a router 72 receives 204 the channel request and sends 205 a login message to Hybridware™ system manager 71. Hybridware™ system manager 71 verifies 206 Hybridware™ client 73 as an authorized user. Then, Hybridware™ router 72 receives 207 a login response from Hybridware™ system manager 71. Hybridware™ router 72 sends 208 an authorization message to Hybridware™ client 73 via high speed downstream channel 76. Hybridware™ client 73 receives 209 the authorization message for use of a selected upstream PSTN channel. Finally, Hybridware™ client 73 sends 212 the selected application data. Accordingly, client application 74 and server application 70 are able to send and receive 213 selected data via the asymmetric hybrid access system 1.

Figure 7:
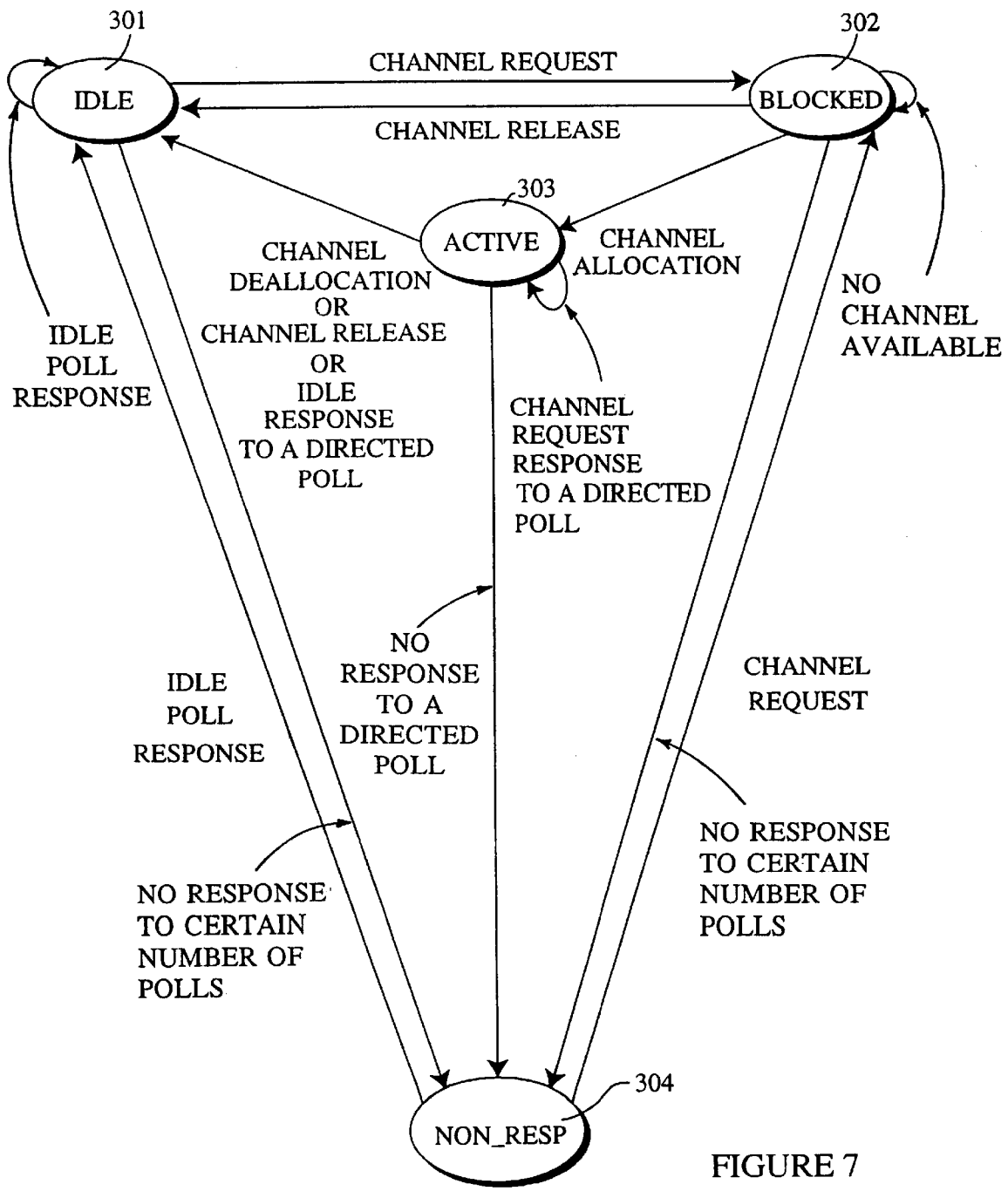
FIG. 7 is a Hybridware™ server state diagram of the upstream channel allocation method according to the present invention.

FIG. 7 is a Hybridware™ server state diagram for upstream channel allocation of the hybrid access system according to one embodiment of the present invention. According to the state diagram of FIG. 7, the Hybridware™ server can be in one of four states: IDLE 301, NON_RESP 304, BLOCKED 302, or ACTIVE 303. In the IDLE state, the Hybridware™ server expects an IDLE poll response. If there is no request to the client from the application or a channel request message, or if there is application data that needs to be sent in the upstream direction. Upon receiving a channel request message, the server transitions the client to a BLOCKED state. In a BLOCKED state, the server sends one of two messages to the client, a channel allocation message or a no channel available message. Upon sending a channel allocation message, the server transitions the client to an ACTIVE state. Upon sending a no channel available message, the client remains in a BLOCKED state. The client will remain in the BLOCKED state until either a channel becomes available in which case the server will transition the client to the ACTIVE state or the server receives a channel release message in which case the server will transition the client to the IDLE state. In the ACTIVE state, the server does not poll the client. The server transitions the client from ACTIVE to IDLE upon receiving a channel deallocation message or upon detecting a system defined inactivity time-out. In the ACTIVE state, the server waits for a periodic heartbeat message from the client. The Hybridware™ server software awaits periodic heartbeat messages from the client at selected time intervals. The server software monitors other channel quality parameters including errors and signal to noise ratios. If the server stops hearing a certain number of operability indications or signals within a system defined interval as to a particular client or if particular parameters (e.g., signal to noise ratio), then the server send a directed poll to the particular client. Essentially, the client is instructed to respond on another control frequency. If the client responds on the designated control frequency, the server reassigns the upstream channel to the client, so that it can continue to operate. If not, the client is deemed NON_RESP. Channel quality monitoring and channel reassignments are done transparently to the user and the applications. If a certain, system defined, consecutive count of heartbeat messages is missed, the server issues a special poll message or directed poll. If the client does not respond, the server transitions to the NON_RESP state. If the client responds to the poll, the server either remains in the ACTIVE state or transitions to the IDLE state. The former happens, if the client responds with a channel request message, and the latter happens, if the client responds with an IDLE poll response. In the former case, the server may decide to assign a different upstream channel to the client. In the BLOCKED or IDLE state, the server will transition the client to NON_RESP, i.e., "non-responsive," state after the client fails to respond to a system defined number of polls. The NON_RESP state is almost identical in terms of state transition to idle state, a difference being that an IDLE poll response transitions the client into an IDLE state.

Figure 8:
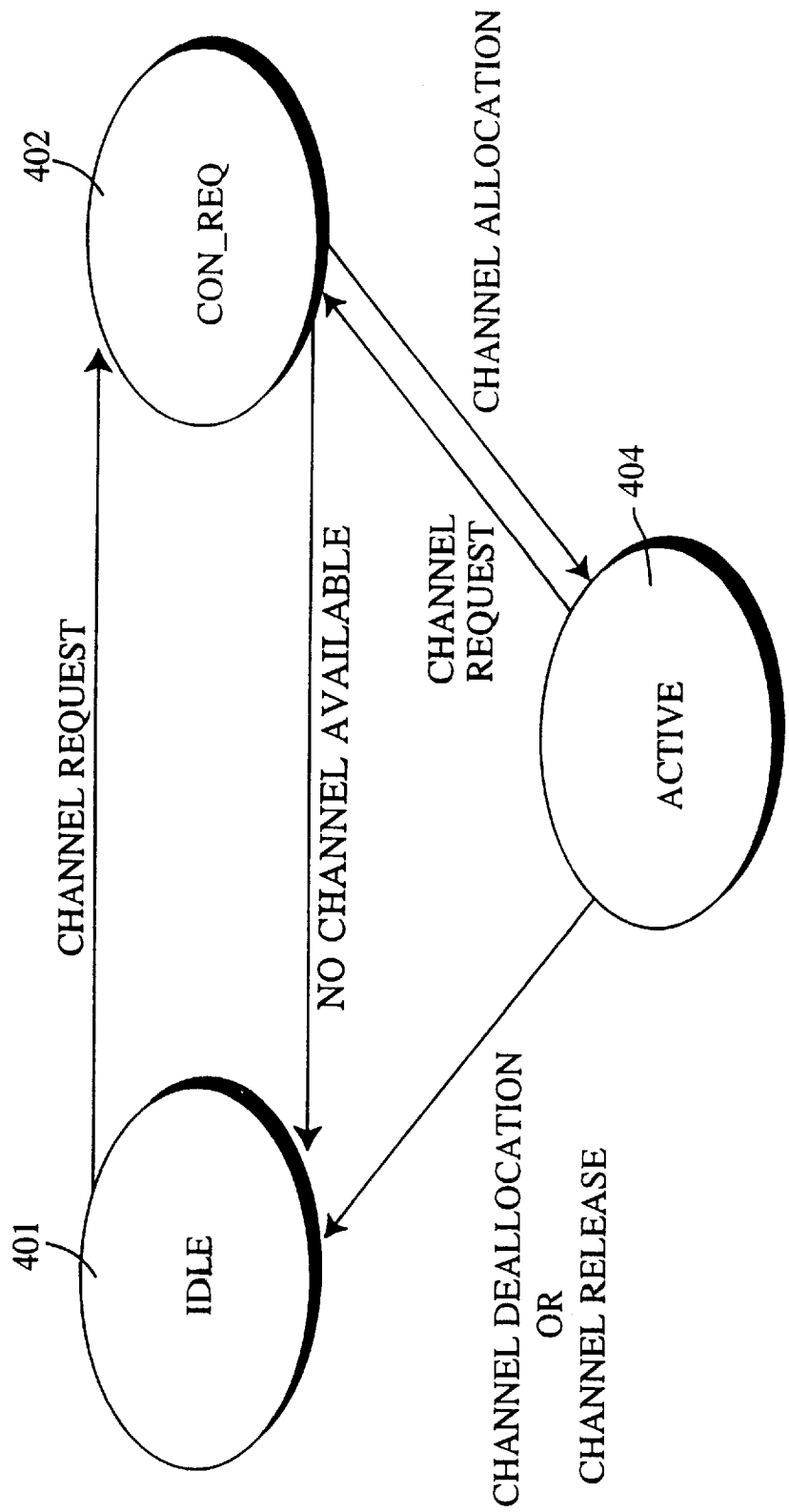
FIG. 8 is a Hybridware™ client state diagram of the upstream channel allocation method according to the present invention.

FIG. 8 is a Hybridware™ client state diagram for upstream channel allocation of the hybrid access system 1 according to an embodiment of the present invention, involving two way cable communication. According to this embodiment, the hybrid upstream client protocol has three states, IDLE 401, CON_REQ, i.e., "connect request" 402, and ACTIVE 404. In the IDLE state, the client, when polled, will transmit an IDLE poll response, if there is no request from the application. However, it will respond with a channel request message, if there is data that needs to be sent upstream. Upon transmitting a channel request message, the client transitions to a CON_REQ state. In the CON_REQ state, the client expects one of two messages from the hybrid router, a channel allocation or a no-channel allocation signal. Upon receiving a channel allocation message, the client informs the application and tunes to the channel it was allocated and transitions to the ACTIVE state. Upon receiving a no-channel available message, the client informs the application and transitions to the IDLE state. In the ACTIVE state, the client forwards data messages from the application to the upstream transmitter. In the ACTIVE state, the client further monitors the application activity and if it detects that no data has moved from the application to the upstream transmitter for a system defined period of time, it will send a channel deallocation request and transition to an idle state. In an ACTIVE state, the application may explicitly request that the channel be released, in which case the client will send a channel deallocation request to the hybrid router and will transition to the IDLE state. In the ACTIVE state, the client periodically sends an operability indication message to the server. If the client receives a poll message during the ACTIVE state, it will send a channel request message and will transition to a CON_REQ state. The hybrid router may also send an unsolicited channel release message, in which case the client will notify the application and transition from ACTIVE state to IDLE state.

Figure 9:
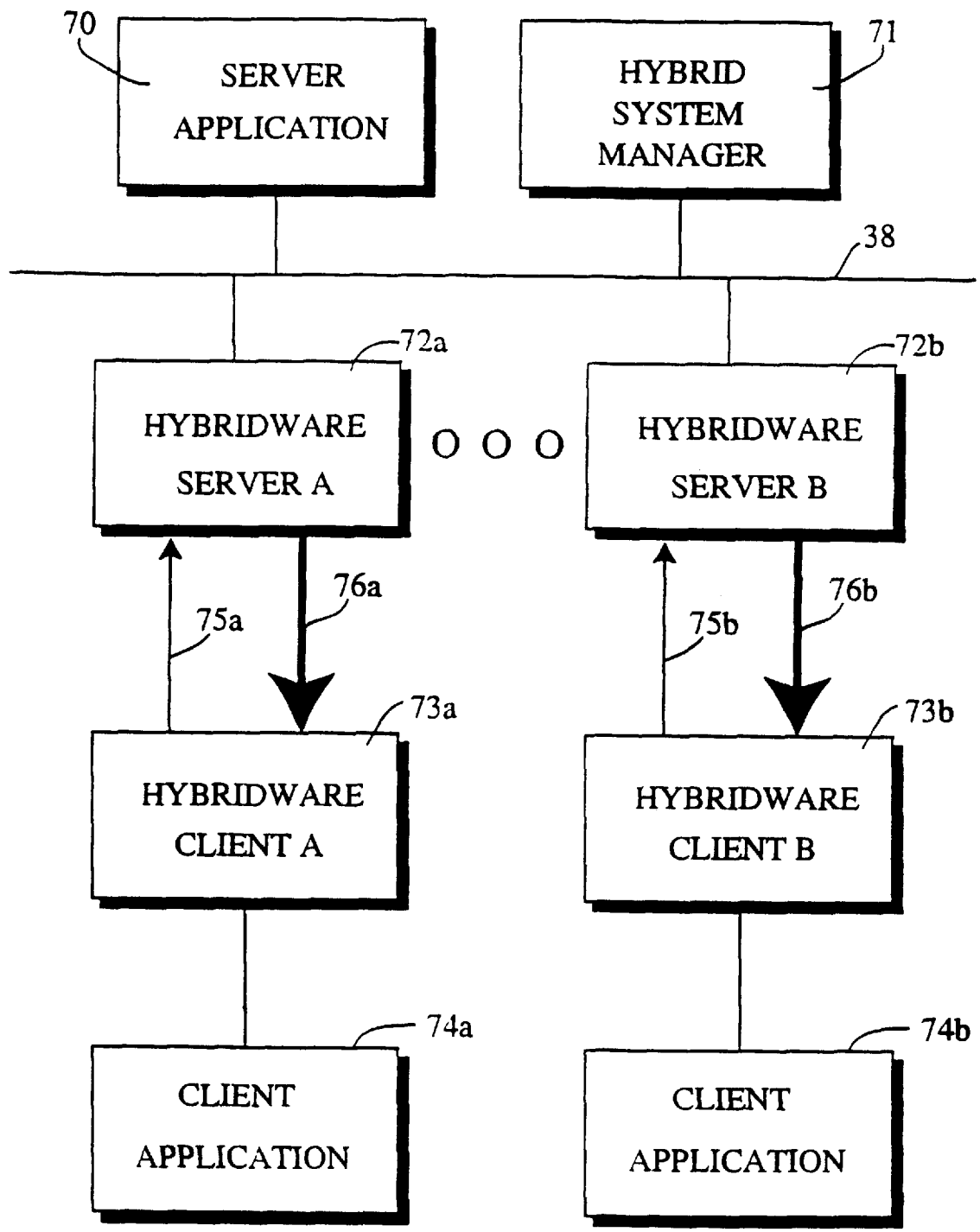
FIG. 9 is a logical data flow diagram showing data flows between router server and client computers of the hybrid access system for automatic handling of multiple clients according to automatic address allocation methods of the present invention.

FIG. 9 is a logical data flow diagram showing data flows between server and client computers of the hybrid access system 1 according to the present invention, for multiple clients under an address allocation protocol simplifying distribution of ip addresses to remote systems. The protocol according to the present invention determines where a given Hybridware™ client is located and how to download its ip address, given that the client has no address yet. Hybrid access system 1 includes a server application 70, a hybrid system manager 71, and Hybridware™ servers 72a & 72b connected to LAN 38. Hybrid access system 1 further includes Hybridware™ clients 73a and 73b and client applications 74a and 74b operating with respective ones of Hybridware™ clients 73a and 73b, Hybridware™ client 73a communicates with Hybridware™ server 79a, as transmitter along upstream channel 75a or as receiver along downstream channel 76a. Hybridware™ client 73b communicates with Hybridware™ server 72b, as transmitter along upstream channel 75b or as receiver along downstream channel 76b. Downstream data traffic is expected to be higher capacity than upstream data traffic: Hence, the bolder depiction of downstream channels 76a and 76b than upstream channels 75a and 75b.

Figure 10:
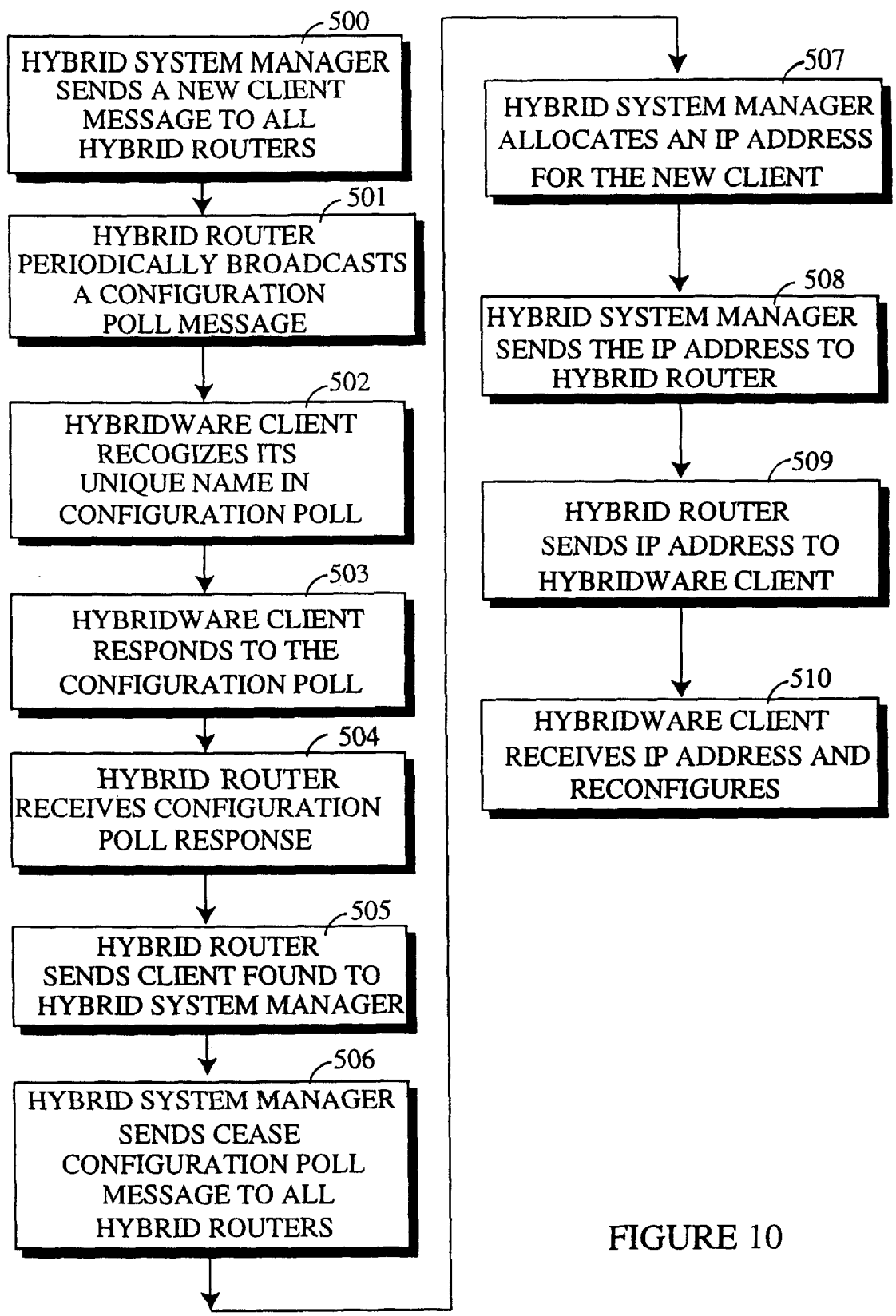
FIG. 10 is a flow chart of address allocation control protocol according to the present invention.

FIG. 10 is a flow chart of address allocation control according to an embodiment of the present invention to logon and configure Hybridware™ clients with a selected unique node name which is entered in the configuration database in the hybrid system manager 71 which is the software portion of network management system 37. In particular, hybrid system manager 71 sends a new client message to all hybrid routers 72a and 72b after learning of particular new clients by message, mail, or telephone call (step 500 in FIG. 10). At this point the hybrid system manager is aware of a Hybridware™ client identification name and equipment serial number, but has not associated the client identification name with a separate unique client address (e.g., Internet Protocol, or IP address) provided by separate automatic registration. Each hybrid router 72a and 72b periodically broadcasts a configuration poll message (step 501). Hybridware™ clients recognize their preselected unique names during a configuration poll (step 502). Hybridware™ clients 72a and 72b respond to the configuration poll. Hybrid routers 72a and 72b receive respective configuration poll responses. Then, hybrid routers 72a and 72b send respective client found messages to system manager 71. System manager 71 then sends a cease configuration poll message to all hybrid routers. Further, system manager 71 allocates an Internet protocol (IP) address and other configuration data for each new client according to the preselected unique names. System manager 71 sends the IP address and other configuration data to the applicable hybrid router 72a, 72b. Then, the applicable hybrid router 72a, 72b sends, using broadcast or unicast and the unique name, the corresponding IP address and other configuration data to the applicable Hybridware™ client. As a result, the Hybridware™ client receives the IP address and other configuration data determined and reconfigures appropriately. In summary, according to the present invention, an automatic address allocation and configuration method in transmissions employs a hybrid access system. Remote users are identified initially with a unique abstract name, e.g., "Bob," and this abstract name is registered by the network management system. Configuration is established by the upstream routers polling the remote users and registering the location of the remote user responding to the poll made with the particular abstract name. Upstream channel allocation is accordingly made subject to the configuration made including abstract name and identified location. Automatic address allocation and configuration is accordingly accomplished on line at an initial log-on session with a new user. The method of the present invention is accordingly swift and simple, eliminating registration delays experienced by many known log-in systems.

Figure 11:
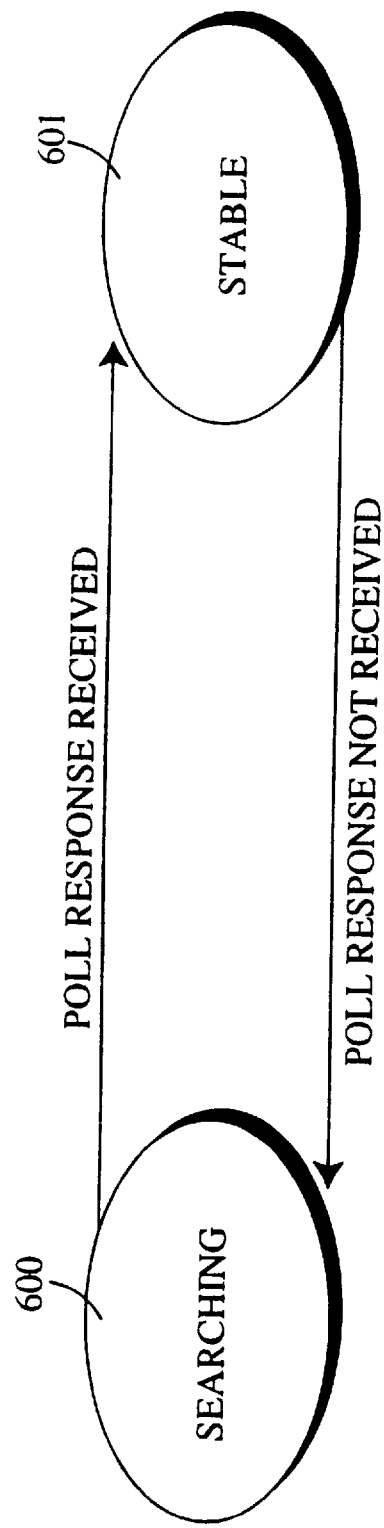
FIG. 11 is a state diagram of the hybrid adaptive gain control protocol according to the present invention.

FIG. 11 is a state diagram of the hybrid adaptive gain control protocol according to the present invention, which overcomes noise and attenuation while transmitting on cable in an upstream direction. The hybrid adaptive gain control protocol has a SEARCHING state 600 and a STABLE state 601. In the STABLE state 601, the protocol evaluates poll messages from the hybrid router. If a poll message indicates loss of a poll response, the protocol transitions to the SEARCHING state 600. Poll responses are transmitted at a fixed power level. In the SEARCHING state 600, the client system responds to polls with a poll response at larger and larger power levels. After receiving a system specified, number of consecutive polls with an indication of a successful poll response, the system transitions to the STABLE state.

Figure 12A:
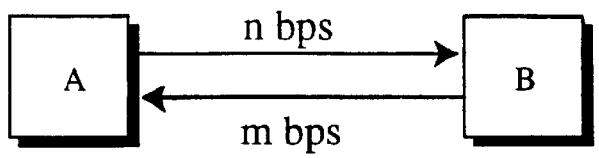
FIG. 12a is a transmission diagram of information exchange between two nodes in an asymmetric network according to the present invention, having a high downstream data rate of n bits per second and a lower upstream data rate of m bits per second.
Figure 12B:
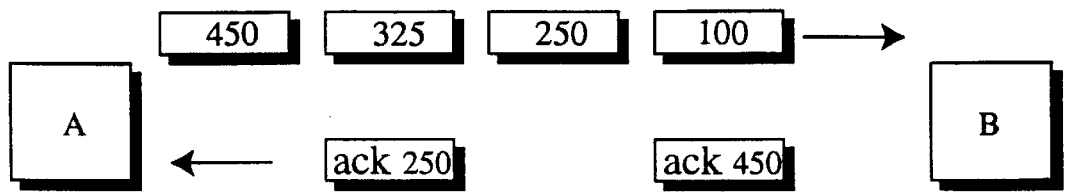
FIG. 12b is a diagram of conventional downstream messaging of first through fourth data packets 100, 250, 325, and 450, between first and second nodes, in parallel with upstream transmission of receipt acknowledge indications.
Figure 12C:
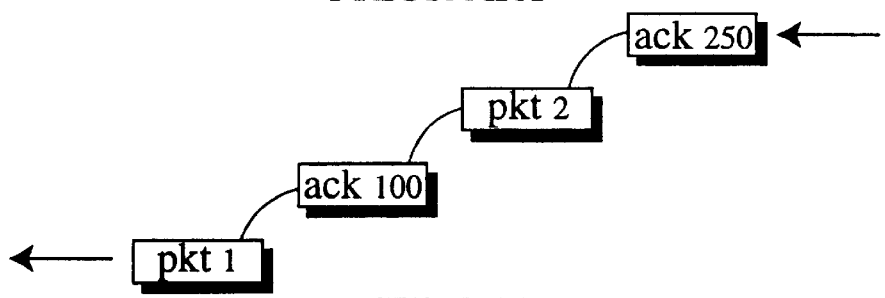
FIG. 12c is a diagram of a conventional transmission buffer queue in a RLA of a remote client station.
Figure 12D:
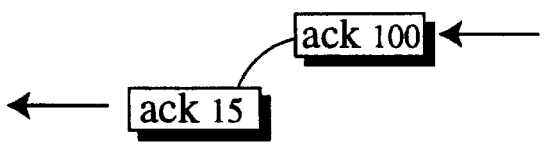
FIG. 12d is a diagram indicating a redundant acknowledgment packet in a conventional transmission buffer queue in a RLA of a remote client station.
Figure 12E:
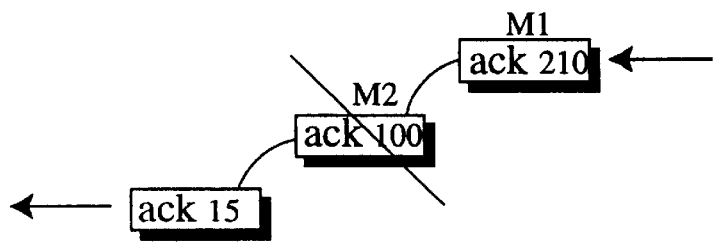
FIG. 12e is a diagram of a conventional transmission buffer queue, indicating no need for an earlier acknowledgment (ack 100) packet in view of a new acknowledgment (ack 210) packet that supersedes the earlier acknowledgment packet.
Figure 12F:
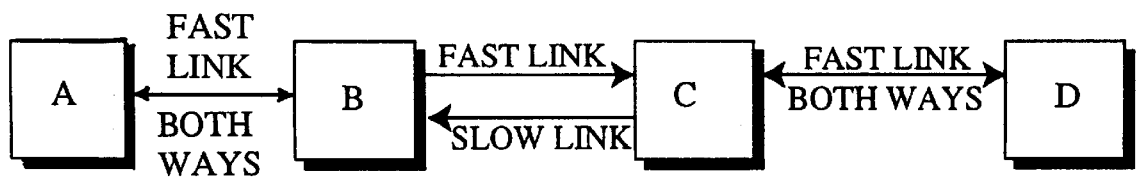
FIG. 12f is a diagram of first through fourth network nodes serially connected to each other in accordance with the present invention, wherein the link between the second and third nodes is asymmetric and that between the first and second and the third and fourth nodes are symmetric.

FIG. 12a is a transmission diagram of information exchange between nodes A and B. Nodes A and B comprise an asymmetric network according to the present invention, having a high downstream data rate of n bits per second and a lower upstream data rate of m bits per second. The downstream data rate n is greater than the upstream data rate m. Node B includes receive and transmission queues to hold information received and to be sent, including acknowledge indications or messages. The acknowledge suppression method according to the present invention relates to the node or system transmitting data acknowledgments, which acknowledges receipt of either data packets or data bytes contained in incoming packets. The numbers on data packets indicate the position of the last data byte of the packet in the data stream, and the acknowledgment numbers indicate that all the bytes of the data stream up to and including the byte indicated have been received. According to the method of the present invention, the acknowledgment of byte k (or packet number k) indicates that all bytes or packets prior to k have been received. According to a method of the present invention, the transmit queue queues up additional acknowledgment packets as new packets are received. FIG. 12b is a diagram of messaging of first through fourth data packets, 100, 250, 325, and 450, between upstream and downstream nodes, in parallel with upstream transmission of receipt acknowledge indications with respect to only two data packets, namely 250 and 450. FIG. 12c is a diagram indicating acknowledgment or first and second packet receptions during a first time period. In particular, packet 1 (i.e., "pkt 1") is currently being sent, and an acknowledge (i.e., "ack 250") message is currently being appended at the end of the transmit queue. FIG. 12d is a diagram indicating acknowledgment of another packet during another period. FIG. 12e is a diagram indicating no need for an acknowledge 100 signal in view of a subsequent acknowledgment having been successful. In particular, according to the acknowledge suppression method of the present invention, not all acknowledgment packets will be sent to node A, because the "ack 210" message carries information which supersedes the "ack 100" message. Accordingly, the amount of traffic on the communication link from B to A is reduced, according to the present invention. In general, this introduces an acknowledge latency, but where all messages queued up for transmission are acknowledgments, acknowledgment latency is reduced. For example, when an "ack 15" signal is transmitted and an "ack 100" message awaits transmission, and an "ack 210" message is appended to the queue, the acknowledge suppression method according to the present invention will delete the "ack 100" message as superfluous. Any new acknowledgments appended while "ack 15" is being transmitted will result in deletions of unnecessary acknowledgments keeping queue length to two. Upon transmit completion of "ack 15," the next acknowledgment, e.g., "ack 210" will be transmitted. Accordingly, the method of the present invention eliminates unnecessary transmission of "ack 100" signals and provides for reduced acknowledgment latency for "ack 210." The ack suppression method according to the present invention, accordingly reduces the probability of queue overflow and potential out of memory conditions in system B. It reduces the load on the communication link from B to A, and in some circumstances reduces acknowledgment latency for data transfers from B to A. FIG. 12f is a diagram of first through fourth network nodes serially connected to each other in accordance with the present invention, wherein the link between the first and second nodes is symmetric, the link between the second and third nodes is asymmetric and that between the third and fourth nodes is symmetric. The acknowledge suppression method of the present invention applies to both the communications system of FIG. 12a, in which nodes A and B are end nodes, as well as to the communications system of FIG. 12f, in which nodes B and C are intermediate systems such as a router, and data packets originating at node D are transmitted through router nodes C and B to a central system connected to node A.

Figure 13:
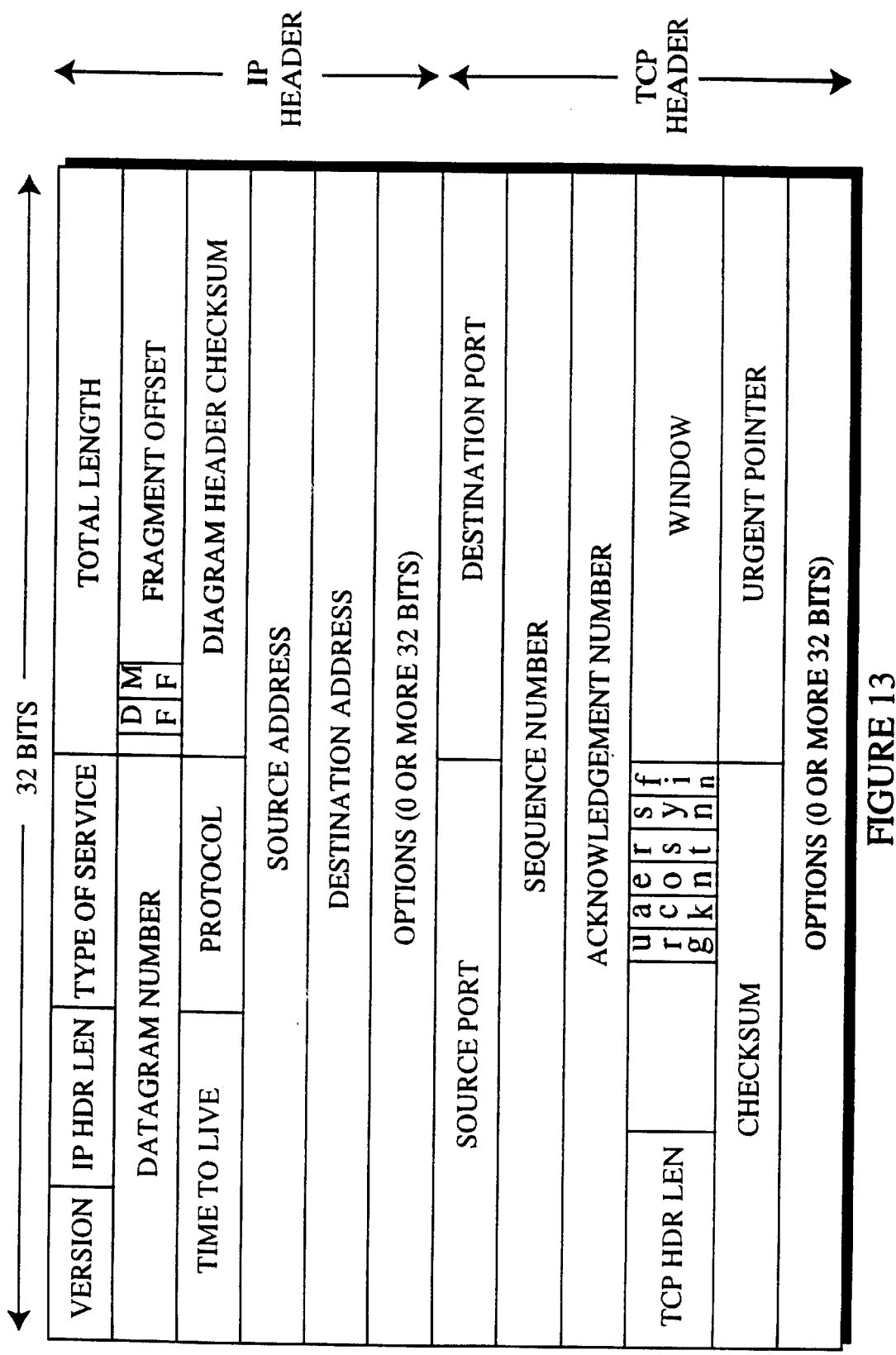
FIG. 13 is a tabular description of transmission control protocols/Internet protocol (TCP/IP) data transmission packet protocol header as used in connection with the present invention.

FIG. 13 is a tabular description of a transmission control protocol/Internet protocol (TCP/IP) data transmission packet protocol header as used in connection with the present invention. The first five 32 bit words and the following IP options are referred to as the IP header. The five words following the IP options together with the words containing TCP options are referred to as the TCP header. The non-ack TCP header is the TCP header less the acknowledgment number field.

FIG. 14a shows sequential data transmission between first and second nodes, according to the present invention. As shown in FIG. 14a, data packets or bytes 100–700 are transmitted from node A to node B. Concomitantly, acknowledge messages, "ack 100, " "ack 200," and "ack 300," were dispatched from node B to node A.

FIG. 14b shows a data packet sequence of packets 100–400 held in the transmit queue during a first time period, followed by a single acknowledgment, "ack 100."

FIG. 14c is a diagram of a data packet sequence transmitted during a later time period, eliminating retransmission of the 300 packet, because another 300 packet was already in the transmission buffer.

Figure 15:
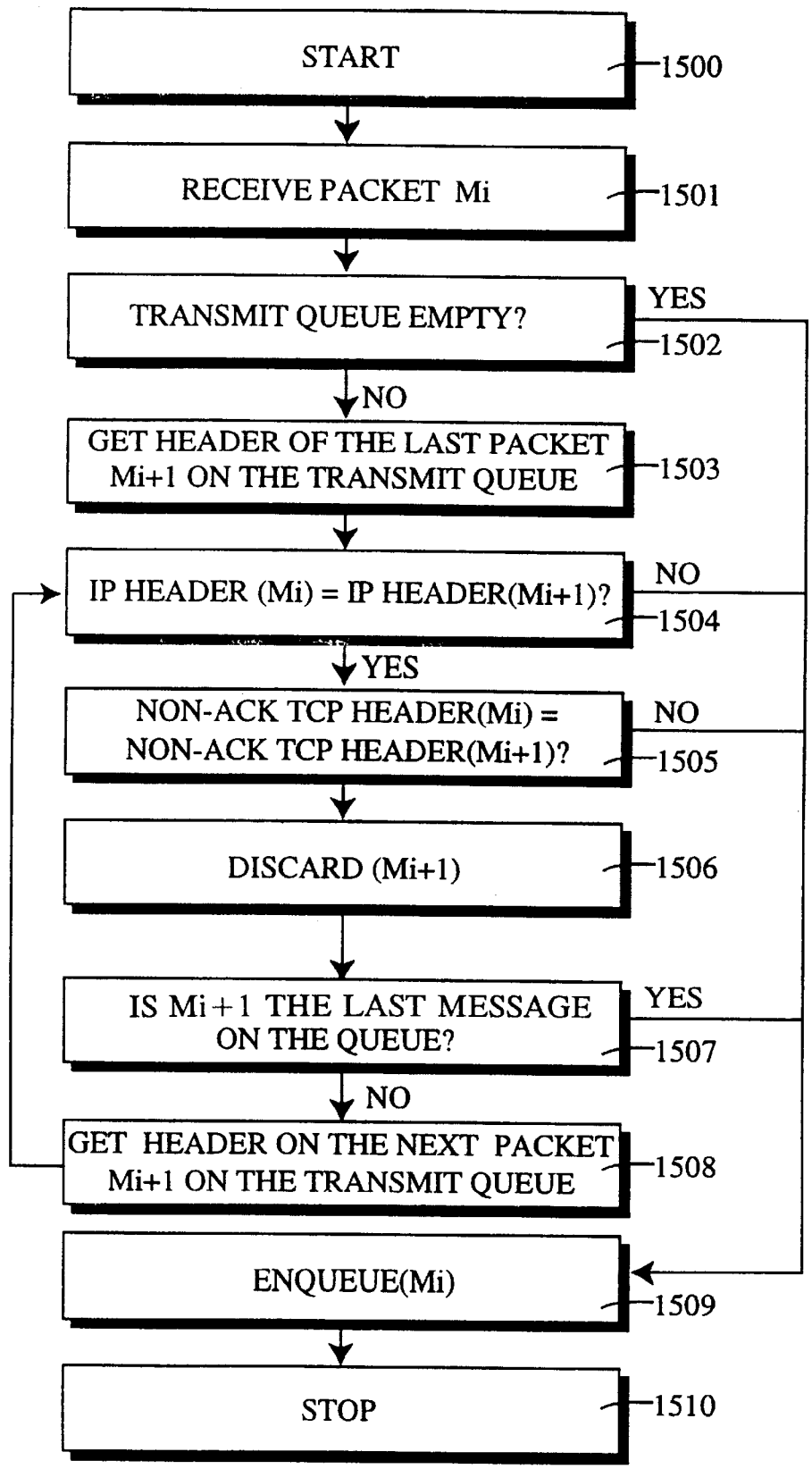
FIG. 15 is a flow diagram of the acknowledge suppression method according to the present invention.

FIG. 15 is a flow diagram of an acknowledge suppression (AS) method, i.e., an AS method, according to the present invention in which receipt of information transmitted from system A to system B over a first independent simplex communication link is acknowledged by system B. The method of the present invention starts 1500 at a particular time, and a first packet Mi of information is received 1501. If the transmit queue is not empty 1502, the header of the last packet Mi+1 on the transmit queue is obtained 1503. If the transmit queue is empty 1502, then Mi is enqueued 1509 and the AS method according to the present invention is completed. If the header of the next packet Mi+1 on the transmit queue equals 1504 the header of packet Mi, and the NON-ACK TCP header of Mi equals 1505 the NON-ACK TCP header of Mi, then Mi+1 is discarded 1506. If the header of the last packet Mi+1 on the transmit queue does not equal 1504 the header of packet Mi, or the NON-ACK TCP header of Mi does not equal 1505 the NON-ACK TCP header of Mi, then Mi is enqueued 1509 and the AS method according to the present invention is completed. If Mi+1 is not the last message on the queue 1507, then the header on the next packet Mi+1 on the transmit queue is obtained 1508, and a comparison is done to determine whether the header of the last packet Mi+1 on the transmit queue equals 1504 the header of packet Mi. If Mi+1 is the last message on the queue 1507, then Mi is enqueued 1509 and the AS method according to the present invention is completed.

Figure 16:
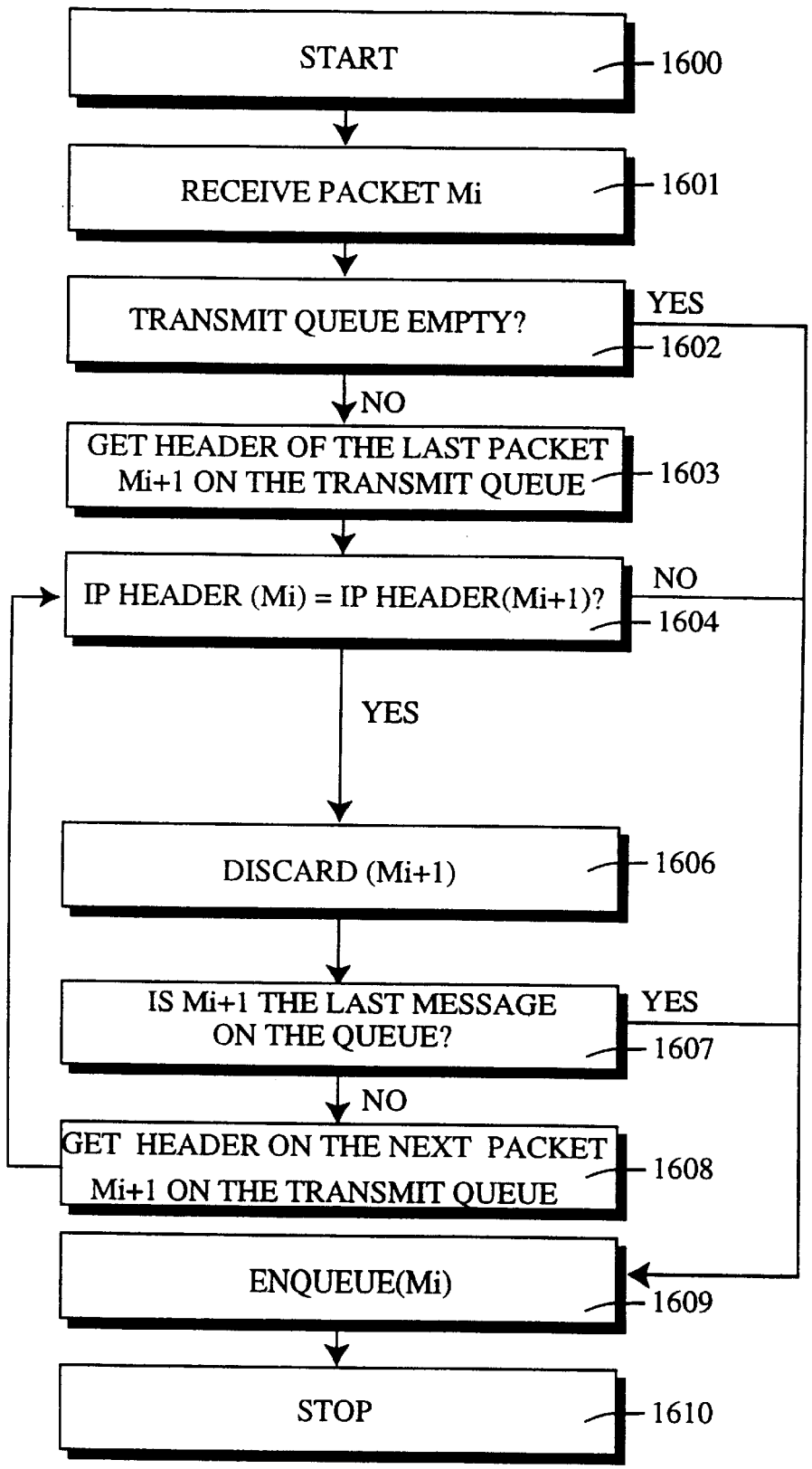
FIG. 16 is a flow diagram of the packet suppression method according to the present invention.

FIG. 16 is a flow diagram of the packet suppression (PS) method according to the present invention. The method of the present invention starts 1600 at a particular time, and a first packet Mi of information is received 1601. If the transmit queue is not empty 1602, the header of the last packet Mi+1 on the transmit queue is obtained 1603. If the transmit queue is empty 1602, then Mi is enqueued 1609 and the PS method according to the present invention is completed. If the header of the last packet Mi+1 on the transmit queue equals 1604 the header of packet Mi, then Mi+1 is discarded 1606. If the header of the last packet Mi+1 on the transmit queue does not equal 1604 the header of packet Mi, then Mi is enqueued 1609 and the PS method according to the present invention is completed. If Mi+1 is not the last message on the queue 1607, then the header on the next packet Mi+1 on the transmit queue is obtained 1608, and a comparison is done to determine whether the header of the last packet Mi+1 on the transmit queue equals 1604 the header of packet Mi. If Mi+1 is the last message on the queue 1607, then Mi is enqueued 1609 and the PS method according to the present invention is completed.

Figure 17:
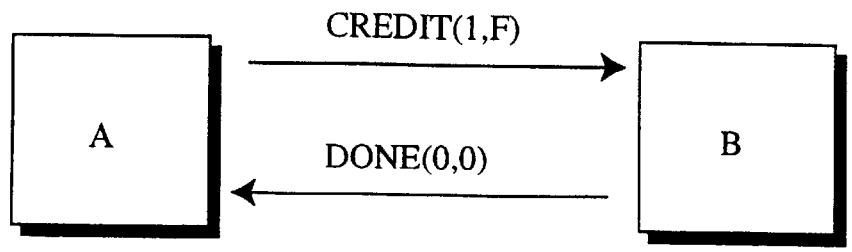
FIG. 17 is a flow diagram of information exchanges between Hybridware™ server and client, under conditions in which the client has no information to transmit.

FIG. 17 is a flow diagram of information exchanges between Hybridware™ server and client, according to conditions in which the client has no data to transmit. A credit (1,F) corresponding to a single predetermined amount of data, e.g., ten bytes, or ten packets at a selected frequency F is transmitted from node A to node B, and a done signal DONE (0,0) is transmitted from node B to node A, indicating that no data packet was transmitted, leaving the existing credit level of the particular channel unchanged. The credit protocol according to the present invention permits single upstream cable channels to be shared by multiple remote link adapters. Alternatively, a single upstream channel is controlled and used by a single remote link adapter until the channel is relinquished. The present invention includes an allocation method in transmissions employing a hybrid access system. According to a method of the present invention, an upstream channel is shared by a plurality of remote link adapters in accordance with a credit criterion, and credit control packets are dispatched to a remote link adapter which permit the remote link adapter to send data packets to arbitrary hosts. Upon sending a data packet, the remote link adapter returns the credit control packet to a Hybridware™ server. A credit permits a remote link adapter to send a certain number of packets up to a maximum number controlled by a configuration parameter MAX_CREDIT_PACKETS, thereby eliminating polling for that period. If a remote link adapter does not have a data packet to send, it returns the credit to the hybrid access system without sending any data packets. The remote link adapter then sets a field in the credit control packet to the number of packets which was sent. If the protocol process at the server does not receive credit status information from the credit control packet within a certain credit time-out, CREDIT_TIMEOUT, in milliseconds, for a certain number of times, FAIL_CNT, consecutively, the remote link adapter is assumed to be in error and is put in a not-responding state (NON_RESP). The overall upstream channel performance of a remote link adapter using a credit channel is lower than a remote link adapter on a sole use upstream channel. If any sole use upstream channel becomes available, this channel is given to the credit remote link adapter that has been waiting the longest for a sole use upstream channel that currently has packets to send.

Figure 18:
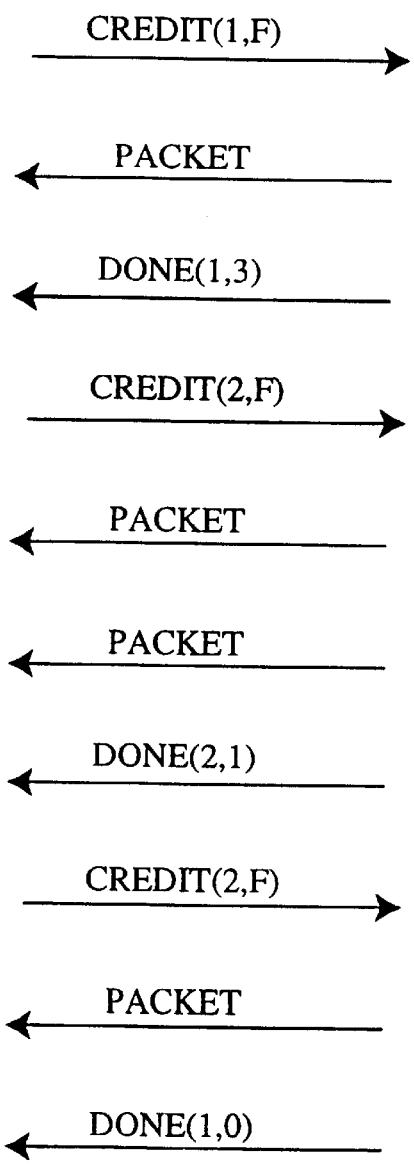
FIG. 18 is a flow diagram of information exchanges between Hybridware™ server and client, under conditions in which the client has information to transmit and the server gradually allocates bandwidth to the client.

FIG. 18 is a flow diagram of information exchanges between Hybridware™ server and client, according to conditions in which the client has information to transmit and the server gradually allocates bandwidth to the client. In particular, a node first provides a single credit at a selected frequency F. Then a packet is sent, consuming the credit, followed by a completion message indicating use of one credit and potential for an additional transmission corresponding to three credits. Next, a credit is provided corresponding to two packets at the selected frequency F, which is followed by two packet transmissions and a completion message indicating consumption of two credits and potential for transmission of one more. In response, another double credit is sent, followed by a single packet and an acknowledgment of transmission of one and potential for no more transmissions.

Figure 19:
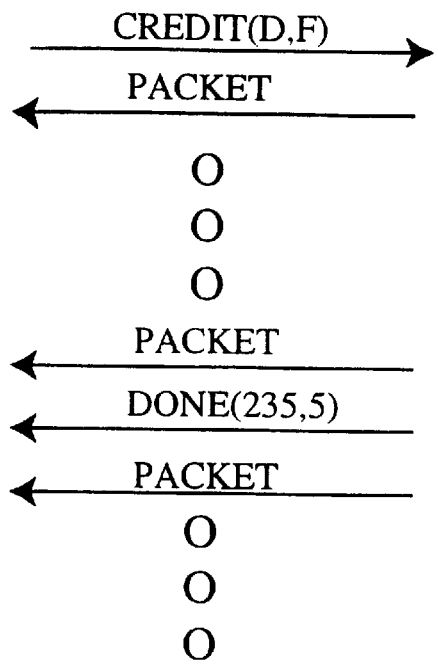
FIG. 19 is a flow diagram of information exchanges between Hybridware™ server and client, under conditions in which the server allocates the client a dedicated channel, the client transmits data and periodically reports to the server with done messages.

FIG. 19 is a flow diagram of information exchanges between Hybridware™ server and client, according to conditions in which the server allocates the client a dedicated channel, the client transmits data and periodically reports to the server with done messages. In particular, a credit indication dedicating a channel at frequency F is provided, followed by 235 packet transmissions. According to prearrangement, a operability indication in the form of a DONE message is provided at an established time indicating potential for five more packet transmissions. The done message indicates completion of 235 packet transmissions, as an accounting function. Because the channel is dedicated, further packet transmissions are made without specific further credit allocations.

Figure 20:
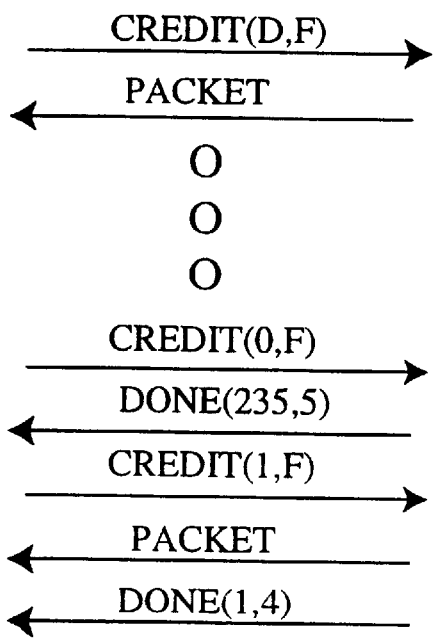
FIG. 20 is a flow diagram of information exchanges between Hybridware™ server and client under conditions in which a dedicated channel is converted into a shared channel.

FIG. 20 is a flow diagram of information exchanges between Hybridware™ server and client, according to conditions in which a dedicated channel is converted into a shared channel. In particular, a credit indication code D indicating a dedicated channel at frequency F is provided, followed by transmission of 235 packets and a credit message stopping channel dedication and switching to a credit mode. Responsive to the credit message a DONE signal accounts for the 235 packets transmitted during the dedicated mode and indicates potential for five more transmissions. This is followed by a credit allocation of one at a selected frequency. Thus, one packet is transmitted, followed by a completion indication specifying potential for four more packets to be transmitted.

What is claimed is:

1. A method of configuring a remote device for achieving a network connection in an asymmetric network system including plural remote devices sharing a common medium for conducting interactive sessions with a host computer under control of a network manager, and a router including a selected one of an IP router, a bridge, and a switching device for providing path control, said method comprising:

receiving at said network manager an indication of a remote device seeking to establish connection with said asymmetric network system, the indication including one of a predetermined unique abstract name and a device ID associated with said remote device, broadcasting a configuration poll message over said common medium, providing a response to said configuration poll message by said remote device, said network manager allocating configuration data for said remote device seeking to establish connection with said network, sending said configuration data to said remote device over said common medium, configuring said remote device in accordance with said allocated configuration data; and controlling said router, by said network manager, to receive new remote device indications over said common medium and broadcast of configuration poll data over said common medium.

2. An asymmetric network communication system including a server, a plurality of remote clients and an information distribution facility for distributing data to said remote clients, said communication system comprising:

a downstream channel that resides in a medium shared by said plurality of remote clients so as to enable said plurality of remote clients to receive high speed data from said server, at least one upstream channel that enables at least one of said remote clients to transmit lower speed return data to said server, and a network manager for effecting transfers of data between said server and said remote clients over said shared medium in accordance with upstream and downstream channel protocols, for initially identifying at least one of said remote clients using an abstract name, for establishing configuration of remote clients by effecting polling of remote clients and registering an identification of a remote client responding to a poll made with a particular abstract name, and for effecting upstream channel allocation according to a configuration information including abstract name and identification.

3. The network communication system as recited in claim 2, wherein said network manager includes a server interface that enables communication with said server, a downstream routing device for enabling transmission of high speed data to said remote clients over said shared medium and an upstream router for receiving return data from said remote clients.

4. The network communication system as recited in claim 3, wherein said remote clients include remote interfaces and said downstream router couples said shared medium to establish a physical connection with said downstream channel and said upstream router couples said remote interfaces to establish a physical connection with said upstream channel.

5. The network communication system as recited in claim 2, wherein said upstream channel and said downstream channel reside in different communication media.

6. The network communication system as recited in claim 2, wherein said shared medium that carries said downstream channel comprises a selected one of a hybrid fiber coaxial cable system, a CATV network, an over-the-air wireless broadcast medium, a cellular network and a direct broadcast satellite network.

7. The network communication system as recited in claim 6, wherein said upstream channel resides in a selected one of a PSTN network, a cable return network of a CATV system, and an over-the-air RF broadcast.

8. The network communication system as recited in claim 2, wherein said network manager selectably controls speed of data transfers on said upstream channel so as to provide more effective utilization of channel bandwidth according to demand by respective remote clients communicating with said shared medium.

9. In an asymmetric network communication system including at least one downstream channel in a shared medium for conveying high speed data from a host to plural client devices and at least one upstream channel for conveying lower speed return data from the plural remote devices to the host, and a system manager being operative for effecting transfers of data on both the upstream and the downstream channels in sessions between the host and the plural client devices, a method of configuring a new client on the communication system comprising:

the system manager receiving a new-client indication associated with the new client, the new-client indication including a predetermined unique abstract name associated with said new client;

broadcasting a configuration poll message over the shared medium, after the system manager receives the new-client indication;

providing a response to the configuration poll message by the new client that identifies the new client;

forwarding a new client found message to the system manager;

ceasing configuration polling;

allocating configuration data for the new client;

sending a protocol address to the new client; and configuring the new client according to the protocol address data.

10. The method as recited in claim 9, wherein the unique abstract name is registered by the system manager into a configuration database.

11. The method as recited in claim 9, wherein the configuration poll message includes the unique client name.

12. In an asymmetric network communication system including at least one downstream channel in a shared medium for conveying high speed data from a host to plural client devices and at least one upstream channel for conveying lower speed return data from the plural remote devices to the host, and a system manager being operative for effecting transfers of data on both the upstream and the downstream channels in sessions between the host and the plural client devices, a method of configuring a new client on the communication system comprising:

the system manager receiving a new-client indication associated with the new client, the new-client indication including an equipment identification number associated with the new client;

broadcasting a configuration poll message over the shared medium, after the system manager receives the new-client indication;

providing a response to the configuration poll message by the new client that identifies the new client;

forwarding a new client found message to the system manager;

ceasing configuration polling;

allocating configuration data for the new client;

sending a protocol address to the new client; and configuring the new client according to the protocol address data.

13. In an asymmetric communication system including a first node, a plurality of second nodes, a shared first channel for sending packets from the first node to the plurality of second nodes, a plurality of second channels for sending packets from the second nodes to the first node, and a third node, a method comprising the step, performed in one of the second nodes before the one of the second nodes has discovered an internetwork address associated with the one of the second nodes, of:

receiving, from the third node, the internetwork address associated with one of the second nodes, the step, performed in the first node, of sending a first plurality of packets to the one of the second nodes, by sending the first plurality of packets over the shared first channel, each of the first plurality of packets including an internetwork header with the internetwork address associated with the one of the second nodes, and the steps, performed in the one of the second nodes, of receiving, from the shared first channel, the first plurality of packets sent from the first node; and sending a second plurality of packets to the first node, by sending the second plurality of packets over one of the second channels, each of the second plurality of packets including an internetwork header with the internetwork address associated with the one of the second nodes.

14. The method of claim 13 further including the step, performed in the one of the second nodes before the first receiving step, of sending a signal for identifying the one of the second nodes.

15. The method of claim 14 further including the steps of receiving the signal for identifying the one of the second nodes; and sending, responsive to the signal for identifying, the internetwork address associated with the second node.

16. The method of claim 13 further including the steps, performed in the one of the second nodes before the first receiving step, of receiving a first signal; and sending, responsive to the first signal, a second signal, the second signal acting to identify the one of the second nodes.

17. The method of claim 16 further including the steps of receiving the second signal; and sending, responsive to the second signal, the internetwork address associated with the second node.

18. The method of claim 13 wherein the plurality of second channels includes a telephone network, and the step of sending a second plurality of packets includes:

sending the second plurality of packets over the telephone network.

19. The method of claim 13 wherein the first channel includes a cable network, and the plurality of second channels includes the cable network, each of the plurality of second channels having respective frequencies in the cable network, and the step of sending a second plurality of packets includes sending includes:

sending the second plurality of packets over the cable network.

20. The method of claim 13 wherein the first channel includes a cable network, and the plurality of second channels includes the cable network, each of the plurality of second channels having a respective time slot and the sending step includes:

sending the signal over the cable network.

21. The method of claim 13 wherein the first channel includes a wireless broadcast network, and the step of sending the first plurality of packets includes:
sending the first plurality of packets over the wireless broadcast network.

22. The method of claim 13 wherein the first channel includes a wireless broadcast network, and the plurality of second channels include the wireless broadcast network, step of sending the second plurality of packets includes:
sending the second plurality of packets over the wireless broadcast network.

23. The method of claim 13 wherein the first channel includes a satellite broadcast network, and the plurality of second channels include a telephone network, and the step of a second plurality of packets sending includes:
sending the signal over the telephone network.

24. The method of claim 13 wherein the first channel is in a selected one of: a CATV network, over-the-air wireless broadcast, an RF broadcast, an electromagnetic transmission, a coaxial cable network, direct broadcast satellite transmission, telephone network, hybrid fiber coaxial network and a cellular broadcast system, and the plurality of second channels are in a selected one of: a CATV network, over-the-air wireless broadcast, an RF broadcast, an electromagnetic transmission, a coaxial cable network, direct broadcast satellite transmission, telephone network, hybrid fiber coaxial network and a cellular broadcast system, and the step of sending the second plurality of packets includes:
sending the second plurality of packets over the selected one of: a CATV network, over-the-air wireless broadcast, an RF broadcast, an electromagnetic transmission, a coaxial cable network, direct broadcast satellite transmission, telephone network, hybrid fiber coaxial network and a cellular broadcast system.

25. In a system including a first channel residing in a shared medium for sending packets, and a plurality of second channels for sending packets, an asymmetric communication system comprising:
a server,
a plurality of clients;
a first node,
each client including
a receiver, active before the client has discovered an internetwork address associated with the client, the receiver acting to receive, from the first node, the internetwork address associated with the client,
the server including
sender that sends a first plurality of packets to the clients, by sending the first plurality of packets over the shared first channel, each of the first plurality of packets including an internetwork header with the internetwork address associated with one of the clients, each client further including
a receiver that receives, from the shared first channel, one of the first plurality of packets sent from the server; and
a sender that sends a second packet to the server, by sending the second packet over one of the second channels, the second packet including an internetwork header with the internetwork address associated with the client.

26. The system of claim 25 further including a second node that processes a signal sent from one of the clients, the signal acting to identify the one of the clients.

27. The system of claim 26 wherein the first and second nodes are configured to send, responsive to the signal for identifying, the internetwork address associated with the client.

28. The system of claim 25 wherein each client includes a responder that
receives a first signal, and
sends, responsive to the first signal, a second signal, the second signal acting to identify the one of the clients.

29. The system of claim 28 wherein the first and second nodes are configured to
receive the second signal; and
send, responsive to the second signal, the internetwork address associated with the client.

30. The system of claim 25 further including:
a telephone network, wherein the plurality of second channels are in the telephone network.

31. The system of claim 25 further including:
a cable network, wherein the first channel is in the cable network, and the plurality of second channels are in the cable network, each of the plurality of second channels having respective frequencies in the cable network, each of the plurality having first channels operating at a lower speed than a speed of the second channel.

32. The system of claim 25 wherein the first channel includes a cable network, and the plurality of second channels includes the cable network, each of the plurality of second channels having a respective time slot.

33. The system of claim 25 wherein the first channel includes a wireless broadcast network, and the plurality of second channels includes the wireless broadcast network, each of the plurality of second channels having a respective frequency.

34. The system of claim 25
a wireless broadcast network, wherein the first channel includes a wireless broadcast network, and the plurality of second channels includes the wireless broadcast network, each of the plurality of seconds channels having a respective time slot.

35. The system of claim 25 wherein the first channel includes a satellite broadcast network, and the plurality of second channels includes a telephone network.

36. The system of claim 25 wherein the first channel is in a selected one of: a CATV network, over-the-air wireless broadcast, an RF broadcast, an electromagnetic transmission, a coaxial cable network, direct broadcast satellite transmission, telephone network, hybrid fiber coaxial network and a cellular broadcast system, and the plurality of second channels are in a selected one of: a CATV network, over-the-air wireless broadcast, an RF broadcast, an electromagnetic transmission, a coaxial cable network, direct broadcast satellite transmission, telephone network, hybrid fiber coaxial network and a cellular broadcast system.

* * * * *